United States Patent
Xue et al.

(10) Patent No.: US 11,968,050 B2
(45) Date of Patent: Apr. 23, 2024

(54) METHOD FOR FEEDING BACK ACK/NACK INFORMATION FOR DOWNLINK DATA AND RELATED DEVICE

(71) Applicant: HUAWEI TECHNOLOGIES CO., LTD., Guangdong (CN)

(72) Inventors: Yifan Xue, Shenzhen (CN); Yun Liu, Shenzhen (CN); Da Wang, Shenzhen (CN); Jian Wang, Beijing (CN); Yongbo Zeng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 16/337,871

(22) PCT Filed: Oct. 10, 2016

(86) PCT No.: PCT/CN2016/101703
§ 371 (c)(1),
(2) Date: Mar. 28, 2019

(87) PCT Pub. No.: WO2018/058698
PCT Pub. Date: Apr. 5, 2018

(65) Prior Publication Data
US 2020/0028629 A1    Jan. 23, 2020

(51) Int. Cl.
*H04L 1/1825* (2023.01)
*H04L 1/1812* (2023.01)
*H04L 5/00* (2006.01)

(52) U.S. Cl.
CPC .......... *H04L 1/1825* (2013.01); *H04L 1/1812* (2013.01); *H04L 5/0055* (2013.01)

(58) Field of Classification Search
CPC ... H04L 1/1825; H04L 1/1812; H04L 5/0055; H04L 1/1864; H04L 1/1896;
(Continued)

(56) References Cited

U.S. PATENT DOCUMENTS

2009/0276676 A1    11/2009  Lee et al.
2011/0090810 A1*    4/2011  Park .................. H04L 1/1854
370/252
(Continued)

FOREIGN PATENT DOCUMENTS

CN        101610551 A    12/2009
CN        101882981 A    11/2010
(Continued)

OTHER PUBLICATIONS

Office Action issued in Russian Application No. 2019112448/08 dated Oct. 17, 2019, 16 pages (with English translation).
(Continued)

*Primary Examiner* — Edan Orgad
*Assistant Examiner* — Malick A Sohrab
(74) *Attorney, Agent, or Firm* — Fish & Richardson P.C.

(57) ABSTRACT

Example methods and apparatus for transmitting ACK/NACK information for data are disclosed. One method includes sending a data packet from a base station to a user equipment. A control signaling is transmitted from the base station to the user equipment and is used to indicate a subframe to be used by the user equipment to send ACK/NACK information corresponding to the data packet.

13 Claims, 13 Drawing Sheets

(58) Field of Classification Search
CPC .. H04L 1/1893; H04L 5/0064; H04W 72/042; H04W 74/0833
See application file for complete search history.

(56) References Cited

U.S. PATENT DOCUMENTS

| | | | |
|---|---|---|---|
| 2011/0267948 A1 | 11/2011 | Koc et al. | |
| 2014/0301320 A1 | 10/2014 | Kim et al. | |
| 2015/0078286 A1* | 3/2015 | Kim | H04L 1/18 370/329 |
| 2015/0085689 A1* | 3/2015 | Vos | H04W 74/0833 370/252 |
| 2015/0124671 A1 | 5/2015 | Tabet et al. | |
| 2016/0300230 A1 | 10/2016 | Cha et al. | |
| 2016/0323070 A1* | 11/2016 | Chen | H04L 1/1896 |
| 2016/0344517 A1* | 11/2016 | Bergström | H04W 72/51 |
| 2017/0238305 A1* | 8/2017 | Chen | H04W 52/38 370/311 |
| 2017/0332373 A1* | 11/2017 | Patel | H04L 5/0055 |
| 2018/0167126 A1* | 6/2018 | Wiberg | H04L 1/1854 |
| 2018/0242317 A1* | 8/2018 | Marinier | H04W 72/0446 |
| 2018/0302936 A1* | 10/2018 | Feng | H04W 74/0833 |
| 2019/0165891 A1* | 5/2019 | Iwai | H04L 5/0055 |
| 2019/0174523 A1* | 6/2019 | Wang | H04W 56/0015 |
| 2019/0190680 A1* | 6/2019 | Si | H04L 5/00 |
| 2019/0223204 A1* | 7/2019 | Kim | H04L 5/0053 |
| 2019/0230647 A1* | 7/2019 | Yang | H04L 5/0051 |
| 2019/0349918 A1 | 11/2019 | Nayeb Nazar et al. | |

FOREIGN PATENT DOCUMENTS

| | | |
|---|---|---|
| CN | 102017507 A | 4/2011 |
| CN | 102075310 A | 5/2011 |
| CN | 102075815 A | 5/2011 |
| CN | 102548011 A | 7/2012 |
| CN | 102594533 A | 7/2012 |
| CN | 103873212 A | 6/2014 |
| CN | 104468030 A | 3/2015 |
| CN | 104580175 A | 4/2015 |
| CN | 105075147 A | 11/2015 |
| CN | 105407086 A | 3/2016 |
| CN | 105577320 A | 5/2016 |
| CN | 105634686 A | 6/2016 |
| CN | 105825382 A | 8/2016 |
| CN | 105871528 A | 8/2016 |
| JP | 2012530475 A | 11/2012 |
| KR | 20110033009 A | 3/2011 |
| KR | 20120030549 A | 3/2012 |
| RU | 2557164 C2 | 7/2015 |
| RU | 2587674 C2 | 6/2016 |
| WO | 2011006442 A1 | 1/2011 |
| WO | 2013019903 A1 | 2/2013 |
| WO | 2013125890 A1 | 8/2013 |
| WO | 2013155839 A1 | 10/2013 |
| WO | 2016121809 A1 | 8/2016 |
| WO | 2016133106 A1 | 8/2016 |
| WO | 2017176182 A1 | 10/2017 |

OTHER PUBLICATIONS

Huawei, "Discussion on timing relations for NR frame structure", 3GPP TSG RAN WG1 Meeting #86, R1-166105, Gothenburg, Sweden, Aug. 22-26, 2016, 4 pages.
Panasonic, "Uplink Acknowledgement timing for HSDPA",3GPP TSG-RAN WG2 Meeting #24, R2-012369, New York, USA, Sep. 22-26, 2001, 9 pages.
Huawei, "Processing time reduction and related procedures for 1ms Tti", 3GPP TSG RAN WG1 Meeting #86, R1-167891, Gothenburg, Sweden, Aug. 22-26, 2016, 8 pages.
Office Action issued in Japanese Application No. 2019538293 dated May 26, 2020, 11 pages (With English Translation).
Office Action issued in Korean Application No. 10-2019-7012221 dated May 26, 2020, 10 pages (With English Translation).
Office Action issued in Chinese Application No. 201680089669.X dated Dec. 13, 2019, 20 pages (With English Translation).
PCT International Search Report and Written Opinion in International Application No. PCT/CN2016/100503, dated Jun. 30, 2017, 10 pages.
PCT International Search Report and Written Opinion in International Application No. PCT/CN2016101703, dated Jul. 3, 2017, 19 pages (With English translation).
Extended European Search Report issued in European Application No. 16917446.3 dated Aug. 20, 2019, 9 pages.
R1-162519—LG Electronics, "Discussion on frame structure for NR," 3GPP TSG RAN WG1 Meeting #84bis, Busan, Korea, Apr. 11-15, 2016, 6 pages.
R1-162511—LG Electronics, "Physical layer aspect of processing time for shortened TTI," 3GPP TSG RAN WG1 Meeting #84bis, Busan, Korea, Apr. 11-15, 2016, 6 pages.
Tdoc 12A010062—Panasonic, "Uplink Acknowledgement timing for HSDPA," RAN WG2 ad-hoc meeting on HSDPA, Sophia Antipolis, France, Nov. 5-6, 2001, 12 pages.
Office Action issued in Chinese Application No. 202010547519.7 dated Mar. 25, 2021, 12 pages (with English translation).
Sony, "Frame Structure Design for NR," 3GPP TSG RAN WG1 Meeting #86, R1-166664, Gothenburg, Sweden, Aug. 22-26, 2016, 9 pages.
Zhou et al., "A New High Layer ACK Mechanism for Real-time Video Transmission in Multi-hop Wireless Network," 2016 International Conference on Internet of Things and Applications (IOTA), Maharashtra Institute of Technology, Pune, India, Jan. 22-24, 2016, 5 pages.
Office Action issued in Australian Application No. 2020281150 dated Feb. 14, 2022, 3 pages.
Tao et al., "Performance Analysis of HSPA Data in TD-SCDMA System," China New Telecommunications, Issue 02, Jan. 2015, 9 pages (Machine English translation).

* cited by examiner

METHOD FOR FEEDING BACK ACK/NACK INFORMATION FOR DOWNLINK DATA AND RELATED DEVICE

CROSS-REFERENCE TO RELATED APPLICATIONS

This application is a National Stage of International Application No. PCT/CN2016/101703, filed on Oct. 10, 2016, which claims priority to International Application No. PCT/CN2016/100503, filed on Sep. 28, 2016. Both of the aforementioned applications are hereby incorporated by reference in their entireties.

TECHNICAL FIELD

Embodiments of the present invention relates to the field of communications technologies, and in particular, to a method for feeding back ACK/NACK information for downlink data and a related device.

BACKGROUND

As new generation 5G communications technologies proceed to a discussion stage, it is necessary to consider whether system structures and access procedures achieved in existing 4G Long Term Evolution (Long Term Evolution, LTE) communications technologies continue to be adopted. On one hand, because communications systems are backward compatible, a new technology developed later tends to be compatible with previously standardized technologies. On the other hand, because 4G LTE includes a large quantity of existing designs, flexibility of 5G needs to be sacrificed to a great extent to achieve compatibility, degrading performance. Therefore, currently the 3GPP organization conducts parallel researches in two directions: considering backward compatibility or without considering backward compatibility. In the two directions, the technical direction without considering backward compatibility is referred to as 5G New Radio (New Radio, NR).

A hybrid automatic repeat request (Hybrid Automatic Repeat reQuest, HARQ) technology is a technology formed by combining a forward error correction (Forward Error Correction, FEC) technology and an automatic repeat request (Automatic Repeat reQuest, ARQ) technology. According to FEC, redundancy information is added so that a receive end can correct some errors, to reduce a quantity of retransmission times. For an error that cannot be corrected by using FEC, the receive end requests, by using an ARQ mechanism, a transmit end to resend data. The receive end detects, by using an error-detection code that is usually a CRC check, whether an error has occurred in a received data packet. If there is no error, the receive end sends a positive acknowledgment (ACK) to the transmit end, and the transmit end continues to send a next data packet after receiving the ACK. If an error has occurred, the receive end discards the data packet or stores the data packet in a HARQ buffer, and then sends a negative acknowledgment (NACK) to the transmit end. The transmit end resends same data after receiving the NACK.

In an LTE system, an existing HARQ procedure for downlink data is shown in FIG. 1. An evolved NodeB (Evolved NodeB, eNB), namely, a base station, first sends initial data (that is, the data block is transmitted for the first time) to user equipment (User Equipment, UE). The UE receives the data, and then decodes and checks the data. If the check succeeds, it indicates that the sending succeeds. In this case, the UE sends ACK information to the eNB. If the check fails, it indicates that the sending fails. In this case, the UE sends NACK information to the eNB. The eNB resends the data (the resent data may be the same as or may be different from the initially transmitted data) after receiving the NACK, and the UE performs procedures such as receiving, decoding, and checking again, until the UE successfully receives the data block or retransmission is performed for a preset maximum quantity of times.

Specifically, in a frequency division duplex (Frequency Division Duplexing, FDD) mode, a time at which UE sends an ACK/a NACK is four subframes away from a time at which downlink data corresponding to the ACK/NACK is received. In other words, if the UE receives the downlink data in an $(n-4)^{th}$ subframe, the UE sends, in an $n^{th}$ subframe, the ACK/NACK corresponding to the data. In a time division duplex (Time Division Duplexing, TDD) mode, because not all subframe can be used to send downlink data or uplink data, a time relationship between the downlink data and an ACK/a NACK corresponding to the downlink data cannot be constrained by using a simple formula. Specifically, in the TDD mode, if the UE receives the downlink data in an $(n-k)^{th}$ subframe, the UE sends, in an $n^{th}$ subframe, the ACK/NACK corresponding to the data. A value of k may vary with different preset modes.

In sum, in the FDD mode, the ACK/NACK can be sent only after a delay of four subframes (4 ms) later than the time at which the corresponding data is received; in the TDD mode, the delay is at least four subframes (4 ms), and can be 13 subframes (13 ms) at most. If the UE fails to decode the data, the data further needs to be retransmitted. In this case, a time for successful transmission increases many fold. In addition, in the FDD mode, different frequency bands are used for uplink transmission and downlink transmission, and the ACK/NACK delay is fixed. In the TDD mode, a transmission mode is one of seven predetermined modes, and the ACK/NACK delay is subject to different predetermined schemes depending on different transmission modes. In 5G NR, if dynamic TDD (dynamic TDD) is used, a same frequency band is used for uplink transmission and downlink transmission, and the ACK/NACK delay is not predetermined. Therefore, existing ACK/NACK information feedback schemes can neither meet a data transmission delay requirement in 5G NR, nor meet a requirement for flexible scheduling.

SUMMARY

Embodiments of the present invention provide a method for transmitting ACK/NACK information for data and a related device, so that after receiving a data packet, user equipment feeds back ACK/NACK information corresponding to the data packet to a base station as soon as possible, to reduce a data transmission delay and improve transmission efficiency; and a location of a subframe for the user equipment to feed back the ACK/NACK information can be adjusted based on a time delay indicated by the base station, to meet a requirement for flexible scheduling.

A first aspect of the embodiments of the present invention provides a method for transmitting ACK/NACK information for data, including:
  sending a data packet to user equipment;
  transmitting control signaling, where the control signaling is used to indicate a subframe to be used by the user equipment to send ACK/NACK information corresponding to the data packet.

With reference to the first aspect, in a first possible implementation of the first aspect, the control signaling is used to indicate a subframe to be used by the user equipment to send ACK/NACK information corresponding to the data packet comprises:

determining a delay capability of the user equipment to send the ACK/NACK information corresponding to the data packet;

determining, based on the control signaling and the delay capability of the user equipment to send the ACK/NACK information corresponding to the data packet, the subframe to be used by the user equipment to send the ACK/NACK information corresponding to the data packet.

With reference to the first possible implementation of the first aspect, in a second possible implementation of the first aspect, the determining a delay capability of the user equipment to send the ACK/NACK information corresponding to the data packet comprises:

determining a processing capability of the user equipment; determining data information of the data packet, where the data information includes at least a size and a modulation order of the data packet; and determining, based on the processing capability and the data information, the delay capability of the user equipment to send the ACK/NACK information corresponding to the data packet.

With reference to the first possible implementation of the the first aspect, in a third possible implementation of the first aspect, the determining, based on the control signaling and the delay capability of the user equipment to send the ACK/NACK information corresponding to the data packet, the subframe to be used by the user equipment to send the ACK/NACK information corresponding to the data packet comprises: determining, by using the control signaling, a first delay of the user equipment in sending the ACK/NACK information corresponding to the data packet;

determining a second delay by using the delay capability of the user equipment to send the ACK/NACK information corresponding to the data packet; and determining, based on a sum of the first delay and the second delay, the subframe to be used by the user equipment to send the ACK/NACK information corresponding to the data packet.

The processing capability of the user equipment is determined, and the delay capability of the user equipment to send the ACK/NACK information corresponding to the data packet is determined based on information about the processing capability and the data information corresponding to the data packet, so that a wait time of the user equipment from receiving the data packet to feeding back the ACK/NACK information can be shortened based on the delay capability for the ACK/NACK information, thereby increasing the speed of the ACK/NACK information feedback for the user equipment, and reducing the communication latency. In addition, the subframe to be used by the user equipment to send the ACK/NACK information corresponding to the data packet is determined based on the control signaling and the delay capability of the user equipment to send the ACK/NACK information corresponding to the data packet, so that the location of a subframe for the user equipment to feed back the ACK/NACK information corresponding to the data packet can be flexibly indicated based on different service priority requirements, to meet priority requirements of different services and balance service load.

With reference to the first possible implementation of the first aspect, in a fourth possible implementation of the first aspect, the determining a delay capability for the ACK/NACK information includes: receiving a preamble that is sent by the user equipment in a random access procedure, and determining, based on the preamble, the delay capability of the user equipment to send the ACK/NACK information corresponding to the data packet.

With reference to the second possible implementation of the first aspect, in a fifth possible implementation of the first aspect, the determining a processing capability of the user equipment comprises:

receiving a preamble that is sent by the user equipment in a random access procedure and determining, based on the preamble, the processing capability of the user equipment.

UEs report their processing capabilities to an eNB in a random access procedure by using different preambles, so that each time data is transmitted, both the UE and the eNB can separately determine a delay capability of the UE to feed back ACK/NACK information corresponding to a data packet. Because the delay capability of the UE for the ACK/NACK information is implicitly carried in a preamble that is sent in the random access procedure, no additional information needs to be exchanged, thereby reducing signaling load and overheads.

With reference to the first possible implementation of the first aspect, in a sixth possible implementation of the first aspect, the determining a delay capability for the ACK/NACK information includes:

receiving Msg3 that is sent by the user equipment in a random access procedure, where Msg3 indicates the delay capability.

With reference to the second possible implementation of the first aspect, in a seventh possible implementation of the first aspect, the determining a processing capability of the user equipment comprises:

receiving Msg3 that is sent by the user equipment in a random access procedure, wherein Msg3 indicates the processing capability of the user equipment.

The UE reports the processing capability information to the eNB by adding a field to Msg3 in the random access procedure, so that each time data is transmitted, both the UE and the eNB can separately determine a delay capability of the UE to feed back ACK/NACK information corresponding to a data packet. In this way, signaling overheads are relatively low, and it's easy for implementation. In addition, the UE can feed back the ACK/NACK information as soon as possible based on its processing capability, to reduce the communication latency.

With reference to any one of the first aspect, the first possible implementation of the first aspect, the second possible implementation of the first aspect, or the third possible implementation of the first aspect, in an eighth possible implementation of the first aspect, the transmitting control signaling, where the control signaling is used to indicate a subframe to be used by the user equipment to send ACK/NACK information corresponding to the data packet includes:

transmitting the control signaling by using downlink control information DCI for the data packet.

The eNB dynamically indicates an additional time delay of the UE by using DCI, so that an ACK/a NACK information sending time can be more flexibly arranged to resolve a problem about an insufficient capacity of a UL control region, and meet the requirements of various service loads and different deployment scenarios.

With reference to the first aspect, the first possible implementation of the first aspect, the second possible implementation of the first aspect, or the third possible implementation of the first aspect, in a ninth possible implementation of the first aspect, the transmitting control signaling, where the control signaling is used to indicate a subframe to be used by the user equipment to send ACK/NACK information corresponding to the data packet includes:

transmitting the control signaling by using RRC signaling.

The eNB dynamically indicates an additional time delay of the UE by using RRC signaling, so that an ACK/a NACK information sending time can be dynamically arranged based on different scenarios, thereby balancing signaling load.

With reference to the first aspect, the first possible implementation of the first aspect, the second possible implementation of the first aspect, or the third possible implementation of the first aspect, in a tenth possible implementation of the first aspect, the transmitting control signaling, where the control signaling is used to indicate a subframe to be used by the user equipment to send ACK/NACK information corresponding to the data packet includes:

transmitting the control signaling by using system information.

The eNB instructs, by using system information, different UEs to feed back ACK/NACK information after different additional delays, so that an ACK/a NACK information sending time can be arranged based on different scenarios, thereby dynamically adapting to different service loads.

With reference to the first aspect, the first possible implementation of the first aspect, the second possible implementation of the first aspect, or the third possible implementation of the first aspect, in an eleventh possible implementation of the first aspect, the first delay is determined based on a service delay requirement corresponding to the data packet, an ACK/a NACK capacity of a subframe corresponding to the second delay, and an ACK/a NACK capacity of a subframe corresponding to the first delay and the second delay.

Whether the ACK/NACK capacity of the subframe corresponding to the second delay is sufficient can be determined based on the ACK/NACK capacity of the subframe corresponding to the second delay. If the ACK/NACK capacity of the subframe corresponding to the second delay is insufficient, feedback of the ACK/NACK information corresponding to the data packet or other ACK/NACK information transmitted in the uplink control region is further delayed for a period of time based on a service priority corresponding to the data packet, to effectively resolve a problem about an ACK/a NACK information transmission failure arising from an insufficient capacity of the uplink control region.

With reference to the eleventh possible implementation of the first aspect, in a twelfth possible implementation of the first aspect, if the ACK/NACK capacity of the subframe corresponding to the second delay is insufficient, and a service priority of the data packet is higher than service priorities of other data packets corresponding to ACKs/NACKs in the subframe corresponding to the second delay, the first delay corresponding to the data packet is set to zero, and a first delay corresponding to any one or more data packets in the other data packets is set to duration of at least one subframe.

With reference to the eleventh possible implementation of the first aspect, in an thirteenth possible implementation of the first aspect, if the ACK/NACK capacity of the subframe corresponding to the second delay is insufficient, a service priority of the data packet is equal to service priorities of other data packets corresponding to ACKs/NACKs in the subframe corresponding to the second delay, and a time for transmitting the data packet is the latest, the first delay corresponding to the data packet is set to duration of at least one subframe, and a first delay corresponding to at least one or more data packets in the other data packets is set to zero.

A second aspect of the embodiments of the present invention provides a method for transmitting ACK/NACK information for data, including:

receiving, by user equipment, a data packet;
receiving control signaling, where the control signaling is used to indicate a subframe to be used by the user equipment to send ACK/NACK information corresponding to the data packet;

With reference to the second aspect, in a first possible implementation of the second aspect, the control signaling is used to indicate a subframe to be used by the user equipment to send ACK/NACK information corresponding to the data packet comprises:

determining a delay capability of the user equipment to send the ACK/NACK information corresponding to the data packet;
determining, based on the control signaling and the delay capability of the user equipment to send the ACK/NACK information corresponding to the data packet, the subframe to be used by the user equipment to send the ACK/NACK information corresponding to the data packet.

With reference to the first possible implementation of the second aspect, in a second possible implementation of the second aspect, the control signaling is used to indicate a subframe to be used by the user equipment to send ACK/NACK information corresponding to the data packet comprises:

determining a processing capability of the user equipment; determining data information of the data packet, where the data information includes at least a size and a modulation order of the data packet; determining, based on the processing capability and the data information, the delay capability of the user equipment to send the ACK/NACK information corresponding to the data packet.

With reference to the first possible implementation of the second aspect, in a third possible implementation of the second aspect, the determining, based on the control signaling and the delay capability of the user equipment to send the ACK/NACK information corresponding to the data packet, the subframe to be used by the user equipment to send the ACK/NACK information corresponding to the data packet comprises:

determining, by using the control signaling, a first delay of the user equipment in sending the ACK/NACK information corresponding to the data packet; determining a second delay by using the delay capability of the user equipment to send the ACK/NACK information corresponding to the data packet; and determining, based on a sum of the first delay and the second delay, the subframe to be used by the user equipment to send the ACK/NACK information corresponding to the data packet.

With reference to the first possible implementation of the second aspect, in a fourth possible implementation of the second aspect, the determining a delay capability of the user equipment to send the ACK/NACK information corresponding to the data packet includes:

sending, by the user equipment, a preamble in a random access procedure, where the preamble indicates the delay capability of the user equipment to send the ACK/NACK information corresponding to the data packet.

With reference to the second possible implementation of the second aspect, in a second possible implementation of the second aspect, the determining a delay capability of the user equipment to send the ACK/NACK information corresponding to the data packet includes:

sending, by the user equipment, Msg3 in a random access procedure, where Msg3 indicates the delay capability.

With reference to the first possible implementation of the second aspect, in a sixth possible implementation of the second aspect, the determining a delay capability of the user equipment to send the ACK/NACK information corresponding to the data packet includes:

sending, by the user equipment, Msg3 in a random access procedure, where Msg3 indicates the delay capability.

With reference to the second possible implementation of the second aspect, in a seventh possible implementation of the second aspect, the determining a processing capability of the user equipment comprises:

sending, by the user equipment, Msg3 in a random access procedure, wherein Msg3 indicates the processing capability of the user equipment.

With reference to the second aspect, the first possible implementation of the second aspect, the second possible implementation of the second aspect, or the third possible implantation of the second aspect, in an eighth possible implementation of the second aspect, the receiving control signaling, where the control signaling is used to indicate a subframe to be used by the user equipment to send ACK/NACK information corresponding to the data packet includes:

receiving the control signaling through downlink control information DCI for the data packet.

With reference to the second aspect, the first possible implementation of the second aspect, the second possible implementation of the second aspect, or the third possible implantation of the second aspect, in a ninth possible implementation of the second aspect, the receiving control signaling, wherein the control signaling is used to indicate a subframe to be used by the user equipment to send ACK/NACK information corresponding to the data packet comprises: receiving the control signaling through RRC signaling.

With reference to the second aspect, the first possible implementation of the second aspect, the second possible implementation of the second aspect, or the third possible implantation of the second aspect, in a tenth possible implementation of the second aspect, the receiving control signaling, where the control signaling is used to indicate a subframe to be used by the user equipment to send ACK/NACK information corresponding to the data packet includes:

receiving radio resource control RRC signaling that is delivered by a base station for the data packet, where the radio resource control RRC signaling includes a newly-added field used to carry an additional time delay; and receiving the control signaling through the RRC signaling.

With reference to the second aspect, the first possible implementation of the second aspect, the second possible implementation of the second aspect, or the third possible implantation of the second aspect, in an eleventh possible implementation of the second aspect, the receiving control signaling, where the control signaling is used to indicate a subframe to be used by the user equipment to send ACK/NACK information corresponding to the data packet includes:

receiving the control signaling through system information.

With reference to the second aspect, the first possible implementation of the second aspect, or the second possible implementation of the second aspect in a twelfth possible implementation of the second aspect, the first delay is determined based on a service delay requirement corresponding to the data packet, an ACK/a NACK capacity of a subframe corresponding to the second delay, and an ACK/a NACK capacity of a subframe corresponding to the first delay and the second delay.

With reference to the twelfth possible implementation of the second aspect, in a thirteenth possible implementation of the second aspect, if the ACK/NACK capacity of the subframe corresponding to the second delay is insufficient, and a service priority of the data packet is higher than service priorities of other data packets corresponding to ACKs/NACKs in the subframe corresponding to the second delay, the first delay corresponding to the data packet is set to zero, and a first delay corresponding to any one or more data packets in the other data packets is set to duration of at least one subframe.

With reference to the thirteenth possible implementation of the second aspect, in an fourteenth possible implementation of the second aspect, if the ACK/NACK capacity of the subframe corresponding to the second delay is insufficient, a service priority of the data packet is equal to service priorities of other data packets corresponding to ACKs/NACKs in the subframe corresponding to the second delay, and a time for transmitting the data packet is the latest, the first delay corresponding to the data packet is set to duration of at least one subframe, and a first delay corresponding to at least one or more data packets in the other data packets is set to zero.

A third aspect of the embodiments of the present invention provides a base station, including: a processing capability obtaining unit, configured to obtain processing capability information that is reported by user equipment, where the processing capability information is used to represent a level of a processing capability of the user equipment;

a data information obtaining unit, configured to obtain data information of a data packet, where the data information includes at least a size and a modulation order of the data packet;

a basic-delay calculating unit, configured to determine, based on the processing capability information and the data information, a basic time delay, namely, a second delay, needed by the user equipment to perform data decoding on the data packet and encode ACK/NACK information;

an additional-delay delivering unit, configured to deliver an additional time delay, namely, a first delay, to the user equipment for the data packet, where the additional time delay is used to indicate a location of a subframe for feeding back the ACK/NACK information corresponding to the data packet; and a feedback information receiving unit, configured to determine, based on a sum of the first delay and the second delay, a subframe to be used by the user equipment to send the ACK/NACK information corresponding to the data packet.

With reference to the third aspect, in a first possible implementation of the third aspect, the processing capability obtaining unit includes:
- a preamble grouping subunit, configured to divide a set of all available preambles in a random access procedure into multiple sequence groups, where each sequence group corresponds to one processing capability level;
- a preamble receiving subunit, configured to receive a preamble that is sent by the user equipment in the random access procedure, and determine a sequence group in which the preamble is located; and
- a processing capability determining subunit, configured to obtain the processing capability information of the user equipment based on the sequence group in which the preamble is located.

With reference to the third aspect, in a second possible implementation of the third aspect, the processing capability obtaining unit includes:
- an information receiving subunit, configured to receive Msg3 that is sent by the user equipment in a random access procedure, where Msg3 includes a newly-added field used to carry the processing capability information;
- a field reading subunit, configured to read a bit value of the newly-added field in Msg3, where the bit value is used to represent the processing capability level of the user equipment; and
- a capability determining subunit, configured to obtain the processing capability information of the user equipment based on the bit value of the newly-added field in Msg3.

With reference to the third aspect, the first possible implementation of the third aspect, or the second possible implementation of the third aspect, in a third possible implementation of the third aspect, the additional-delay delivering unit includes:
- a first field adding subunit, configured to add, to downlink control information DCI for the data packet, a field used to carry the additional time delay;
- a first bit presetting subunit, configured to preset, for the newly-added field in the downlink control information DCI, a bit value used to represent the corresponding additional time delay; and
- a first delay delivering subunit, configured to deliver the additional time delay to the user equipment by using the bit value of the newly-added field in the downlink control information DCI.

With reference to the third aspect, the first possible implementation of the third aspect, or the second possible implementation of the third aspect, in a fourth possible implementation of the third aspect, the additional-delay delivering unit includes:
- a second field adding subunit, configured to add, to radio resource control RRC signaling for the data packet, a field used to carry the additional time delay;
- a second bit presetting subunit, configured to preset, for the newly-added field in the radio resource control RRC signaling, a bit value used to represent the corresponding additional time delay; and
- a second delay delivering subunit, configured to deliver the additional time delay to the user equipment by using the bit value of the newly-added field in the radio resource control RRC signaling.

With reference to the third aspect, the first possible implementation of the third aspect, or the second possible implementation of the third aspect, in a fifth possible implementation of the third aspect, the additional-delay delivering unit includes:
- a third field adding subunit, configured to add, to system information for the data packet, a field used to carry the additional time delay;
- a third bit presetting subunit, configured to preset, for the newly-added field in the system information, a bit value used to represent the corresponding additional time delay; and
- a third delay delivering subunit, configured to deliver the additional time delay to the user equipment by using the bit value of the newly-added field in the system information.

A fourth aspect of the embodiments of the present invention provides a base station, including at least one processor, a memory, a communications interface, and a bus. The at least one processor, the memory, and the communications interface are connected to and communicate with each other by using the bus. The communications interface is configured to establish a communication connection to user equipment. The processor is configured to invoke executable program code stored in the memory, to perform the following operations:
- sending a data packet to the user equipment;
- transmitting control signaling, where the control signaling is used to indicate a subframe to be used by the user equipment to send ACK/NACK information corresponding to the data packet;

With reference to the fourth aspect, in a first possible implementation of the fourth aspect, the determining a delay capability of the user equipment to send the ACK/NACK information corresponding to the data packet comprises:
- determining a delay capability of the user equipment to send the ACK/NACK information corresponding to the data packet;
- determining, based on the control signaling and the delay capability of the user equipment to send the ACK/NACK information corresponding to the data packet, the subframe to be used by the user equipment to send the ACK/NACK information corresponding to the data packet.

With reference to the first possible implementation of the first aspect, in a second possible implementation of the fourth aspect, wherein the determining a delay capability of the user equipment to send the ACK/NACK information corresponding to the data packet comprises:
- determining a processing capability of the user equipment;
- determining data information of the data packet, where the data information includes at least a size and a modulation order of the data packet;
- determining, based on the processing capability and the data information, the delay capability of the user equipment to send the ACK/NACK information corresponding to the data packet.

With reference to the first possible implementation of the first aspect, in a third possible implementation of the fourth aspect, the determining a delay capability of the user equipment to send the ACK/NACK information corresponding to the data packet comprises:
- determining, by using the control signaling, a first delay of the user equipment in sending the ACK/NACK information corresponding to the data packet;
- determining a second delay by using the delay capability of the user equipment to send the ACK/NACK information corresponding to the data packet.

determining, based on a sum of the first delay and the second delay, the subframe to be used by the user equipment to send the ACK/NACK information corresponding to the data packet.

With reference to the first possible implementation of the fourth aspect, in a fourth possible implementation of the fourth aspect, the determining a delay capability of the user equipment to send the ACK/NACK information corresponding to the data packet includes:

receiving a preamble that is sent by the user equipment in a random access procedure, and determining, based on the preamble, the delay capability of the user equipment to send the ACK/NACK information corresponding to the data packet.

With reference to the first the possible implementation of the fourth aspect, in a fifth possible implementation of the fourth aspect, wherein the determining a processing capability of the user equipment comprises:

receiving a preamble that is sent by the user equipment in a random access procedure, and determining, based on the preamble, the processing capability of the user equipment.

With reference to the first possible implementation of the fourth aspect, in a sixth possible implementation of the fourth aspect, the determining a delay capability of the user equipment to send the ACK/NACK information corresponding to the data packet includes:

receiving Msg3 that is sent by the user equipment in a random access procedure, where Msg3 indicates the delay capability.

With reference to the first possible implementation of the fourth aspect, in a seventh possible implementation of the fourth aspect, the determining a processing capability of the user equipment comprises:

receiving Msg3 that is sent by the user equipment in a random access procedure, wherein Msg3 indicates the processing capability of the user equipment.

With reference to the fourth aspect, the first possible implementation of the fourth aspect, the second possible implementation of the fourth aspect, or the third possible implementation of the fourth aspect, in an eighth possible implementation of the fourth aspect, the transmitting control signaling, where the control signaling is used to indicate a subframe to be used by the user equipment to send ACK/NACK information corresponding to the data packet includes:

transmitting the control signaling by using downlink control information DCI for the data packet.

With reference to the fourth aspect, the first possible implementation of the fourth aspect, the second possible implementation of the fourth aspect, or the third possible implementation of the fourth aspect, in a ninth possible implementation of the fourth aspect, the transmitting control signaling, where the control signaling is used to indicate a subframe to be used by the user equipment to send ACK/NACK information corresponding to the data packet includes:

transmitting the control signaling by using RRC signaling.

With reference to the fourth aspect, the first possible implementation of the fourth aspect, or the second possible implementation of the fourth aspect, or the third possible implementation of the fourth aspect, in a tenth possible implementation of the fourth aspect, the transmitting control signaling, where the control signaling is used to indicate a subframe to be used by the user equipment to send ACK/NACK information corresponding to the data packet includes:

transmitting the control signaling by using system information.

With reference to the fourth aspect, the first possible implementation of the fourth aspect, or the second possible implementation of the fourth aspect, in a sixth possible implementation of the fourth aspect, the first delay is determined based on a service delay requirement corresponding to the data packet, an ACK/a NACK capacity of a subframe corresponding to the second delay, and an ACK/a NACK capacity of a subframe corresponding to the first delay and the second delay.

With reference to the eleventh possible implementation of the fourth aspect, in a possible implementation of the fourth aspect, if the ACK/NACK capacity of the subframe corresponding to the second delay is insufficient, and a service priority of the data packet is higher than service priorities of other data packets corresponding to ACKs/NACKs in the subframe corresponding to the second delay, the first delay corresponding to the data packet is set to zero, and a first delay corresponding to any one or more data packets in the other data packets is set to duration of at least one subframe.

With reference to the eleventh implementation of the fourth aspect, in an thirteenth possible implementation of the fourth aspect, if the ACK/NACK capacity of the subframe corresponding to the second delay is insufficient, a service priority of the data packet is equal to service priorities of other data packets corresponding to ACKs/NACKs in the subframe corresponding to the second delay, and a time for transmitting the data packet is the latest, the first delay corresponding to the data packet is set to duration of at least one subframe, and a first delay corresponding to at least one or more data packets in the other data packets is set to zero.

A fifth aspect of the embodiments of the present invention provides user equipment, including:

a processing capability reporting unit, configured to obtain processing capability information of the user equipment, and report the processing capability information to a base station, where the processing capability information is used to represent a level of a processing capability of the user equipment;

a data information obtaining unit, configured to obtain data information of a data packet, where the data information includes at least a size and a modulation order of the data packet;

a basic-delay calculating unit, configured to determine, based on the processing capability information and the data information, a basic time delay, namely, a second delay, needed by the user equipment to perform data decoding on the data packet and encode ACK/NACK information;

an additional-delay receiving unit, configured to receive an additional time delay, namely, a first delay, delivered by the base station for the data packet, where the additional time delay is used to indicate a location of a subframe for feeding back the ACK/NACK information corresponding to the data packet; and a feedback information sending unit, configured to determine, based on a sum of the first delay and the second delay, a subframe to be used by the user equipment to send the ACK/NACK information corresponding to the data packet.

With reference to the fifth aspect, in a first possible implementation of the fifth aspect, the processing capability reporting unit includes:

a sequence grouping subunit, configured to divide a set of all available preambles in a random access procedure into multiple sequence groups, where each sequence group corresponds to one processing capability level;

a sequence selecting subunit, configured to select, as a preamble for the random access procedure, a preamble from a sequence group corresponding to the processing capability level of the user equipment; and a capability reporting subunit, configured to report the processing capability information of the user equipment to the base station by using the preamble for the random access procedure.

With reference to the fifth aspect, in a second possible implementation of the fifth aspect, the processing capability reporting unit includes:

a field adding subunit, configured to add, to the Msg3 of a random access procedure, a field used to carry the processing capability information;

a bit presetting subunit, configured to preset, for the newly-added field in Msg3 based on the processing capability information, a bit value used to represent the corresponding processing capability level; and a capability reporting subunit, configured to report the processing capability information of the user equipment to the base station by using the bit value of the newly-added field in Msg3.

With reference to the fifth aspect, the first possible implementation of the fifth aspect, or the second possible implementation of the fifth aspect, in a third possible implementation of the fifth aspect, the additional-delay receiving unit includes:

a first information receiving subunit, configured to receive downlink control information DCI that is delivered by the base station for the data packet, where the DCI includes a newly-added field used to carry the additional time delay;

a first field reading subunit, configured to read a bit value of the newly-added field in the downlink control information DCI, where the bit value is used to represent the corresponding additional time delay; and a first delay obtaining subunit, configured to obtain, based on the bit value of the newly-added field in the downlink control information DCI, the additional time delay that is delivered by the base station for the data packet.

With reference to the fifth aspect, the first possible implementation of the fifth aspect, or the second possible implementation of the fifth aspect, in a fourth possible implementation of the fifth aspect, the additional-delay receiving unit includes:

a second information receiving subunit, configured to receive radio resource control RRC signaling that is delivered by the base station for the data packet, where the radio resource control RRC signaling includes a newly-added field used to carry the additional time delay;

a second field reading subunit, configured to read a bit value of the newly-added field in the radio resource control RRC signaling, where the bit value is used to represent the corresponding additional time delay; and a second delay obtaining subunit, configured to obtain, based on the bit value of the newly-added field in the radio resource control RRC signaling, the additional time delay that is delivered by the base station for the data packet.

With reference to the fifth aspect, the first possible implementation of the fifth aspect, or the second possible implementation of the fifth aspect, in a fifth possible implementation of the fifth aspect, the additional-delay receiving unit includes:

a third information receiving subunit, configured to receive system information that is delivered by the base station for the data packet, where the system information includes a newly-added field used to carry the additional time delay;

a third field reading subunit, configured to read a bit value of the newly-added field in the system information, where the bit value is used to represent the corresponding additional time delay; and a third delay obtaining subunit, configured to obtain, based on the bit value of the newly-added field in the system information, the additional time delay that is delivered by the base station for the data packet.

A sixth aspect of the embodiments of the present invention provides user equipment, including at least one processor, a memory, a communications interface, and a bus. The at least one processor, the memory, and the communications interface are connected to and communicate with each other by using the bus. The communications interface is configured to establish a communication connection to a base station. The processor is configured to invoke executable program code stored in the memory, to perform the following operations:

receiving, by the user equipment, a data packet;
receiving control signaling, where the control signaling is used to indicate a subframe to be used by the user equipment to send ACK/NACK information corresponding to the data packet;

With reference to the six aspect, in a first possible implementation of the aspect aspect, the control signaling is used to indicate a subframe to be used by the user equipment to send ACK/NACK information corresponding to the data packet comprises:

determining a delay capability of the user equipment to send the ACK/NACK information corresponding to the data packet;

determining, based on the control signaling and the delay capability of the user equipment to send the ACK/NACK information corresponding to the data packet, the subframe to be used by the user equipment to send the ACK/NACK information corresponding to the data packet.

With reference to the first possible implementation of the six aspect, in a second possible implementation of the aspect aspect, the determining a delay capability of the user equipment to send the ACK/NACK information corresponding to the data packet comprises:

determining a processing capability of the user equipment;

determining data information of the data packet, where the data information includes at least a size and a modulation order of the data packet;

determining, based on the processing capability and the data information, the delay capability of the user equipment to send the ACK/NACK information corresponding to the data packet.

With reference to the first possible implementation of the six aspect, in a third possible implementation of the aspect aspect, the determining a delay capability of the user equipment to send the ACK/NACK information corresponding to the data packet comprises:

determining, by using the control signaling, a first delay of the user equipment in sending the ACK/NACK information corresponding to the data packet;

determining a second delay by using the delay capability of the user equipment to send the ACK/NACK information corresponding to the data packet; and determining, based on a sum of the first delay and the second delay, the subframe to be used by the user equipment to send the ACK/NACK information corresponding to the data packet.

With reference to the first possible implementation of the sixth aspect, in a fourth possible implementation of the sixth aspect, the determining a delay capability of the user equipment to send the ACK/NACK information corresponding to the data packet includes:

sending, by the user equipment, a preamble in a random access procedure, where the preamble indicates the delay capability of the user equipment to send the ACK/NACK information corresponding to the data packet.

With reference to the sixth aspect, in a second possible implementation of the sixth aspect, the determining a delay capability of the user equipment to send the ACK/NACK information corresponding to the data packet includes:

sending, by the user equipment, Msg3 in a random access procedure, where Msg3 indicates the delay capability.

With reference to the sixth aspect, the first possible implementation of the sixth aspect, the second possible implementation of the sixth aspect, or the third possible implementation of the sixth aspect, in a sixth possible implementation of the sixth aspect, the receiving control signaling, where the control signaling is used to indicate a subframe to be used by the user equipment to send ACK/NACK information corresponding to the data packet includes:

receiving the control signaling through downlink control information DCI for the data packet.

With reference to the sixth aspect, the first possible implementation of the sixth aspect, the second possible implementation of the sixth aspect, or the third possible implementation of the sixth aspect, in a seventh possible implementation of the sixth aspect, the receiving control signaling, where the control signaling is used to indicate a subframe to be used by the user equipment to send ACK/NACK information corresponding to the data packet includes:

receiving the control signaling through RRC signaling.

With reference to the sixth aspect, the first possible implementation of the sixth aspect, or the second possible implementation of the sixth aspect, or the third possible implementation of the sixth aspect, in an eighth possible implementation of the sixth aspect, the receiving control signaling, where the control signaling is used to indicate a subframe to be used by the user equipment to send ACK/NACK information corresponding to the data packet includes:

receiving the control signaling through system information.

With reference to the sixth aspect, the first possible implementation of the sixth aspect, the second possible implementation of the sixth aspect, or the third possible implementation of the sixth aspect, in a ninth possible implementation of the sixth aspect, the first delay is determined based on a service delay requirement corresponding to the data packet, an ACK/a NACK capacity of a subframe corresponding to the second delay, and an ACK/a NACK capacity of a subframe corresponding to the first delay and the second delay.

With reference to the ninth possible implementation of the sixth aspect, in a tenth possible implementation of the sixth aspect, if the ACK/NACK capacity of the subframe corresponding to the second delay is insufficient, and a service priority of the data packet is higher than service priorities of other data packets corresponding to ACKs/NACKs in the subframe corresponding to the second delay, the first delay corresponding to the data packet is set to zero, and a first delay corresponding to any one or more data packets in the other data packets is set to duration of at least one subframe.

With reference to the ninth possible implementation of the sixth aspect, in an eleventh possible implementation of the sixth aspect, if the ACK/NACK capacity of the subframe corresponding to the second delay is insufficient, a service priority of the data packet is equal to service priorities of other data packets corresponding to ACKs/NACKs in the subframe corresponding to the second delay, and a time for transmitting the data packet is the latest, the first delay corresponding to the data packet is set to duration of at least one subframe, and a first delay corresponding to at least one or more data packets in the other data packets is set to zero.

According to the method for feeding back ACK/NACK information for data and the related devices, the signaling is transmitted in the downlink control information DCI, the RRC signaling, or the system information for the data packet, so that when the ACK/NACK capacity of the subframe corresponding to the second delay is insufficient, the first delay of the UE can be determined based on the service priority corresponding to the data packet, to effectively resolve a problem about an ACK/a NACK information transmission failure arising from the insufficient ACK/NACK capacity of the subframe corresponding to the second delay. In addition, the first delay of the user equipment is set for the data packet, and the location of the subframe for feeding back the ACK/NACK information can be further flexibly indicated based on a channel load, to meet different service priority requirements and balance channel load.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

The following describes technical solutions in embodiments of the present invention with reference to the accompanying drawings in the embodiments of the present invention.

The following describes technical solutions in embodiments of the present invention with reference to the accompanying drawings in the embodiments of the present invention.

The embodiments of the present invention provide a method for feeding back ACK/NACK information for downlink data based on reporting of a processing capability of UE, including at least the following three parts:

1. An eNB sends a data packet to user equipment, and transmits control signaling. The control signaling is used to indicate a subframe to be used by the user equipment to send ACK/NACK information corresponding to the data packet.

2. The UE reports a processing capability (processing capability) of the UE to the eNB. The eNB calculates, based on the processing capability reported by the UE, a minimum delay amount, referred to as a basic time delay or a second delay, needed by the UE to feed back the ACK/NACK information. The UE determines the basic time delay based on the processing capability of the UE, and selects a subframe closest to the basic time delay to feed back the ACK/NACK information corresponding to the downlink data packet. The eNB selects the corresponding subframe based on the basic time delay, to receive the ACK/NACK information.

3. The eNB instructs the UE to feed back the ACK/NACK information after an additional delay plus the basic delay amount. A delay amount corresponding to the additional delay is referred to as an additional time delay or a first delay. Specifically, the eNB may determine the additional time delay based on a scheduling requirement or based on a service priority corresponding to the downlink data packet, and deliver the additional time delay to the UE. After receiving the additional time delay, the UE selects a corresponding subframe based on a sum of the basic time delay and the additional time delay, to feed back the ACK/NACK information corresponding to the downlink data packet. Correspondingly, the eNB selects the corresponding subframe based on the sum of the basic time delay and the additional time delay, to receive the ACK/NACK information corresponding to the downlink data packet.

Figure 1:
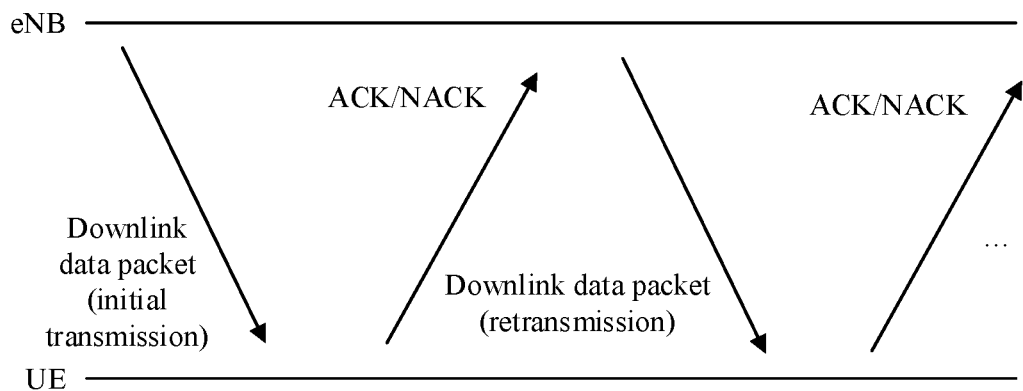
FIG. 1 is a schematic diagram of an existing HARQ procedure for a downlink data packet.
Figure 2:
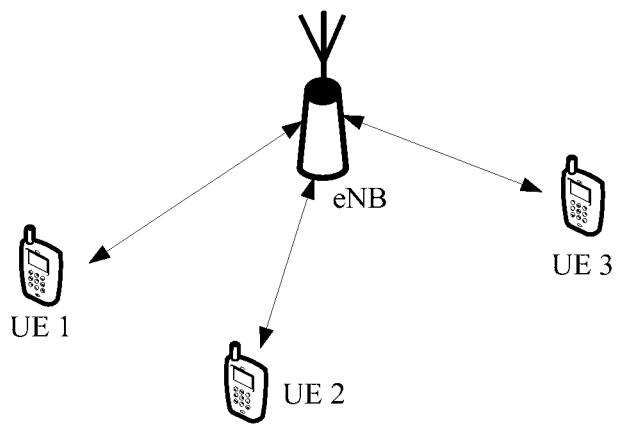
FIG. 2 is a schematic diagram of an application scenario of a method for feeding back ACK/NACK information for downlink data according to an embodiment of the present invention.

Referring to FIG. 2, an embodiment of the present invention provides an application scenario of a method for feeding back ACK/NACK information for downlink data. The scenario includes a base station eNB and multiple user equipments UEs, for example, UE 1, UE 2, and UE 3. The eNB is responsible for communication with the plurality of UEs. The UE 1, the UE 2, and the UE 3 respectively receive downlink data from the eNB, and feed back ACK/NACK information when appropriate. How to ensure that ACK/NACK information can be flexibly transmitted without causing any conflict when different UEs quickly feed back the ACK/NACK information is a problem that needs to be resolved in this embodiment of the present invention.

In a process in which the UE establishes a connection to a cell corresponding to the base station, the UE is already in downlink synchronization with the cell after a cell search process. Therefore, the UE can receive downlink data. However, the UE can perform uplink transmission only after achieving uplink synchronization with the cell, to feed back ACK/NACK information for the downlink data. In this embodiment, the UE establishes a connection to the cell and implements uplink synchronization by using a random access procedure (Random access procedure).

Figure 3:
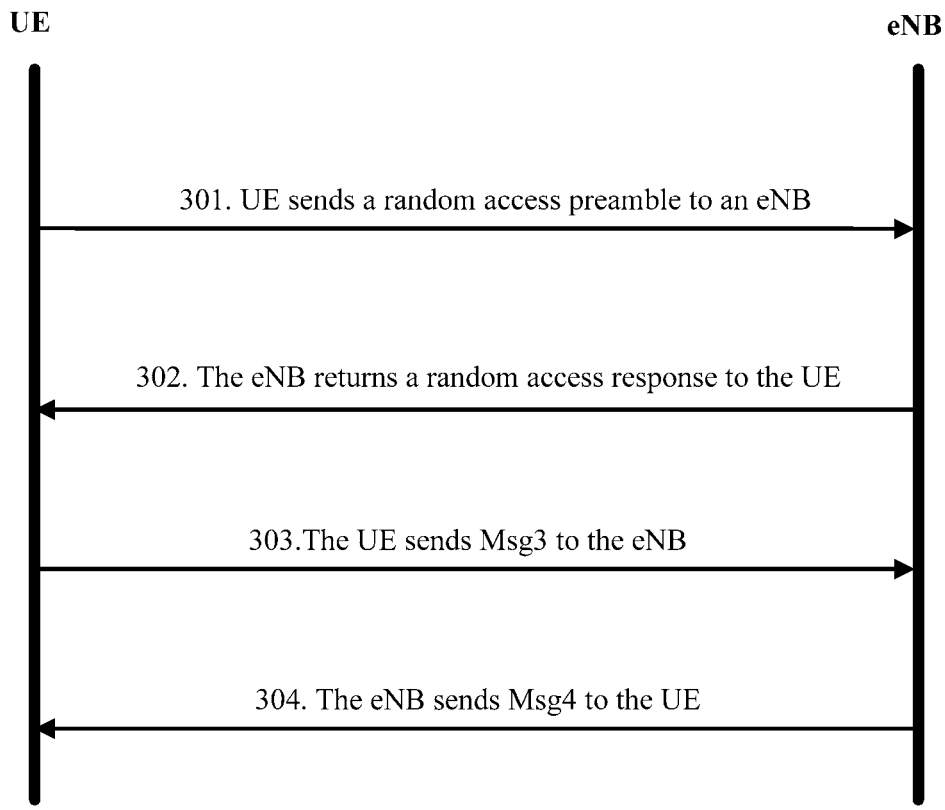
FIG. 3 is a schematic flowchart in which user equipment establishes a connection to a base station by using a random access procedure in the application scenario shown in FIG. 2.

Referring to FIG. 3, the random access procedure mainly includes the following four steps:

Step 301: The UE sends a random access preamble (random access preamble) to the eNB.

Step 302: The eNB returns a random access response (random access response) to the UE.

Step 303: The UE sends Msg3 to the eNB. Information included in Msg3 varies with different cases. For example, Msg3 may include an RRC connection request, an RRC connection re-establishment request, or the like.

Step 304: The eNB sends Msg4 to the UE. Information included in Msg4 varies with different cases. For example, Msg4 may include an RRC connection establishment or re-establishment instruction.

In step 301, when the UE sends the random access preamble to the eNB, the preamble (preamble) used by the UE is any preamble selected from a set of available preambles. In each cell, there are 64 available preambles, and these sequences are all generated based on a Zadoff-Chu sequence. It is worthwhile to note that, a hybrid automatic repeat request (Hybrid Automatic Repeat reQuest, HARQ) for uplink data is already in use when the UE sends Msg3, and a HARQ for downlink data is already in use when the eNB sends Msg4.

Figure 4A:
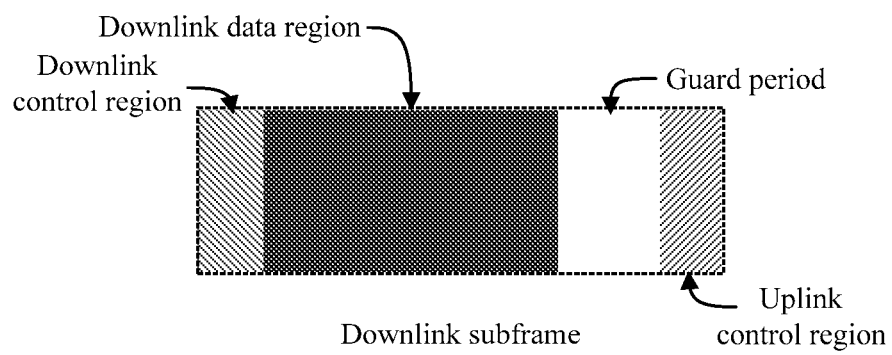
FIG. 4A and FIG. 4B are schematic structural diagrams of a subframe in a method for feeding back ACK/NACK information for downlink data according to an embodiment of the present invention.
Figure 4B:
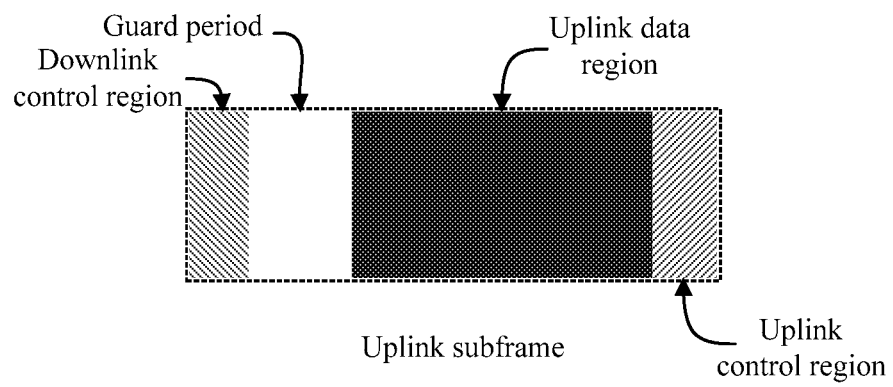

Referring to FIG. 4A and FIG. 4B, an embodiment of the present invention provides a subframe structure, including three parts. A first part is a downlink control region (DL control region), in which downlink scheduling signaling such as a DL grant or uplink scheduling signaling such as a UL grant can be transmitted, to notify UE of resource configuration. A second part is a data region (data region), in which an eNB can transmit downlink data, or the UE can transmit uplink data based on the resource allocated in the UL grant. A third part is an uplink control region (UL control region), in which the UE can feed back ACK/NACK information for the downlink data, or transmit uplink channel state information (Channel State Information, CSI) for use by the eNB in subsequent scheduling. In some cases, the UL control region is occupied by uplink data (UL data). In this embodiment, to distinguish between different types of subframes, a subframe for transmitting downlink data is referred to as a downlink self-contained subframe, as shown in FIG. 4A, whereas a subframe for transmitting uplink data is referred to as an uplink self-contained subframe, as shown in FIG. 4B.

In the downlink self-contained subframe, the eNB notifies, by using downlink scheduling signaling such as a DL grant, the UE of particular resources on which the eNB is to transmit downlink data. Next, after the DL grant is transmitted, the eNB transmits the downlink data on the corresponding resources. After the downlink data is transmitted, the UE sends corresponding uplink control information such as ACK/NACK information or CSI after a guard period (guard period, GP). In the uplink self-contained subframe, the eNB allocates, by using uplink scheduling signaling such as a UL grant, resources in the data region for the UE to transmit uplink data. After a GP, the UE transmits the uplink data based on the resources allocated in the uplink scheduling signaling such as the UL grant. After the transmission ends, the scheduled UE transmits uplink control information such as ACK/NACK information or CSI.

Figure 5:
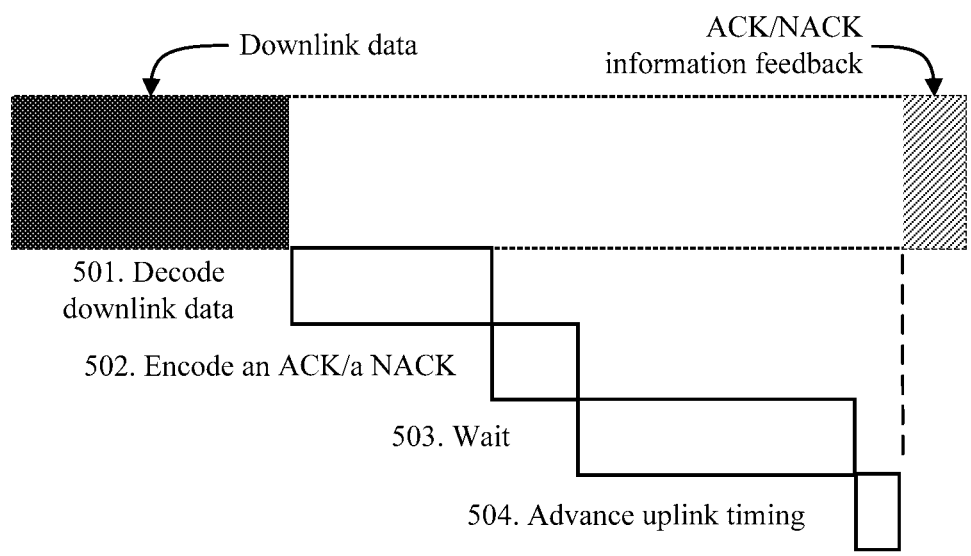
FIG. 5 is a schematic diagram of a processing procedure of user equipment from receiving a downlink data packet to feeding back ACK/NACK information in a method for feeding back ACK/NACK information for downlink data according to an embodiment of the present invention.

Referring to FIG. 5, in a method for feeding back ACK/NACK information for downlink data provided in an embodiment of the present invention, user equipment may perform the following processing procedure from receiving a downlink data packet to feeding back ACK/NACK information:

Step 501: Decode downlink data.
Step 502: Encode an ACK/a NACK.
Step 503: Wait.
Step 504: Advance uplink timing.

In 5G NR communication, to ensure a sufficiently small transmission delay, after receiving downlink data, UE needs to feed back ACK/NACK information to an eNB as soon as possible. However, in the four steps, step 501 (decode downlink data) and step 502 (encode an ACK/a NACK) are determined based on a hardware processing speed, and step 504 (advance uplink timing) is determined based on a relative distance between the UE and the eNB. In both cases, it is difficult to shorten the transmission latency. Step 503 (wait) is performed because a time delay is usually predetermined between receiving the downlink data and sending a corresponding ACK/NACK, to implement time alignment, and this step may be shortened by using a proper design. It may be understood that, if the design is sufficiently proper, a time in the waiting step may be shortened to zero.

In this embodiment, to reduce as much as possible the time delay between receiving the downlink data and feeding back the corresponding ACK/NACK information, that is, to shorten the waiting time as much as possible, the UE needs to report information about a processing capability of the UE to the eNB. The processing capability information is used to represent a level of the processing capability of the UE. It may be understood that, a higher processing capability level of the UE indicates a shorter time needed to process a same task (for example, demodulation of a downlink data packet and encoding of corresponding ACK/NACK information), and a shorter time delay needed to feed back an ACK/a NACK. On this basis, both the eNB and the UE can determine, based on the processing capability information and information such as a size and a modulation order of a corresponding downlink data transmission packet, a time, referred to as a basic time delay or a second delay, needed by the UE to perform data decoding on the downlink data packet and encode the ACK/NACK information (namely, step 501 and step 502) in current downlink data reception. In addition, information about the uplink timing advancing (namely, step 504) is related to only the UE, and is known to the UE. In sum, after the UE reports its processing capability information to the eNB, both the UE and the eNB can learn the basic time delay needed by the UE to feed back the ACK/NACK information, and can select a UL control region in a subframe closest to the basic time delay to transmit the ACK/NACK information, thereby reducing as much as possible the time delay between transmitting the downlink data and feeding back the corresponding ACK/NACK information. The subframe closest to the basic time delay is a subframe that is closest to a subframe for transmitting the downlink data packet and whose time interval to the subframe for transmitting the downlink data packet is not less than the basic time delay. It should be noted that in the random access procedure, a HARQ is already in use when Msg4 is sent and received. Therefore, the UE needs to report its processing capability information to the eNB before Msg4 is sent.

Figure 6:
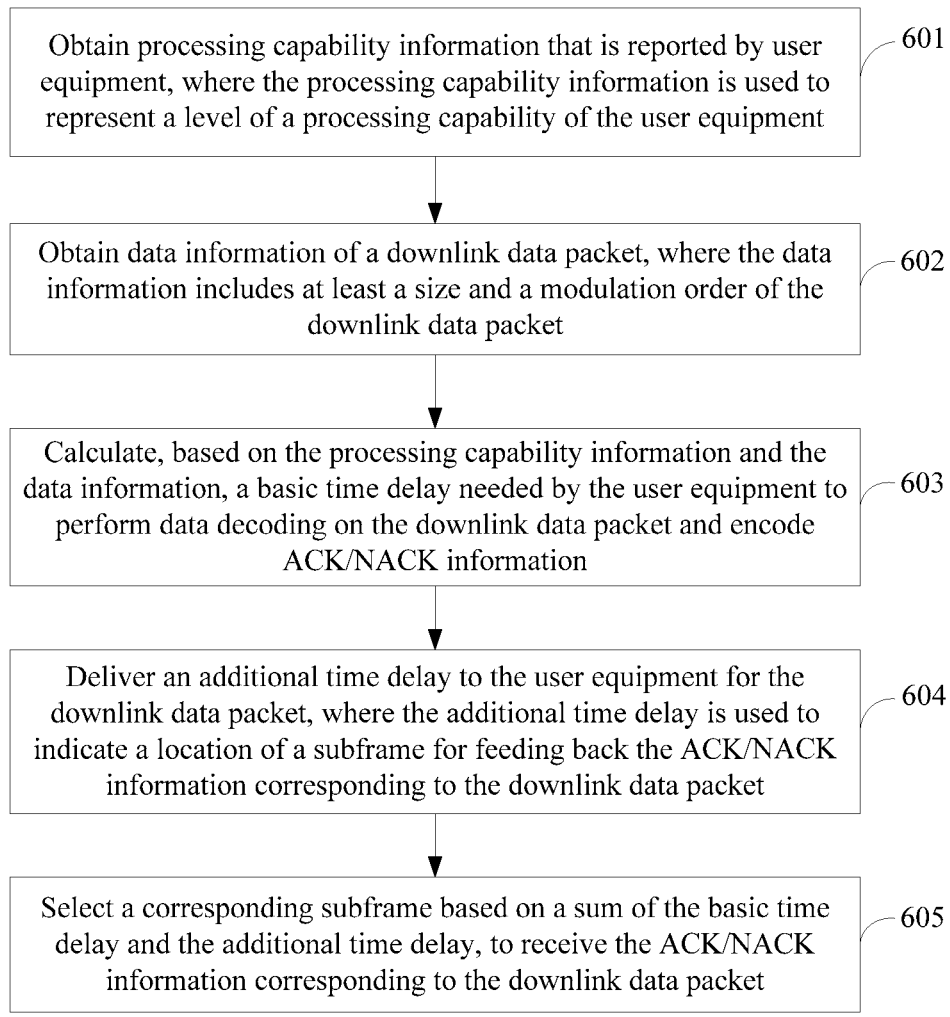
FIG. 6 is a first schematic flowchart of a method for feeding back ACK/NACK information for downlink data according to an embodiment of the present invention.

Referring to FIG. 6, an embodiment of the present invention provides a method for feeding back ACK/NACK information for downlink data, including the following steps:

Step 601: Obtain processing capability information that is reported by user equipment, where the processing capability information is used to represent a level of a processing capability of the user equipment.

Step 602: Obtain data information of a downlink data packet, where the data information includes at least a size and a modulation order of the downlink data packet.

Step 603: Calculate, based on the processing capability information and the data information, a basic time delay, namely, a second delay, needed by the user equipment to perform data decoding on the downlink data packet and encode ACK/NACK information.

Step 604: Deliver an additional time delay, namely, a first delay, to the user equipment for the downlink data packet, where the additional time delay is used to indicate a location of a subframe for feeding back the ACK/NACK information corresponding to the downlink data packet.

Step 605: Select a corresponding subframe based on a sum of the basic time delay and the additional time delay, to receive the ACK/NACK information corresponding to the downlink data packet.

In this embodiment, the method for feeding back ACK/NACK information for downlink data may be performed by a base station, for example, an eNB. The user equipment may be a mobile phone. The base station may establish communication connections to multiple user equipments. It may be understood that, different user equipments have different processing capability levels. The user equipment obtains the processing capability information that is used to represent the processing capability level, and reports the processing capability information to the base station, so that the base station can calculate, based on information such as a size and a modulation order of the downlink data packet and the processing capability information that is reported by the user equipment, the basic time delay needed by the user equipment to perform data decoding on the downlink data packet and encode the ACK/NACK information. In addition, the user equipment can calculate, based on the processing capability information and the information such as the size and the modulation order of the received downlink data packet, the basic time delay needed to perform data decoding on the downlink data packet and encode the ACK/NACK information, and select a subframe corresponding to the basic time delay, to feed back the ACK/NACK information corresponding to the downlink data packet. Correspondingly, the base station selects, based on the basic time delay, the subframe corresponding to the basic time delay, to receive the ACK/NACK information that corresponds to the downlink data packet and that is fed back by the user equipment.

It may be understood that, after calculating the basic time delay, the base station may further determine, based on a service priority corresponding to the downlink data packet, an amount of ACK/NACK information transmitted in an uplink control region in the subframe corresponding to the basic time delay, and a capacity of the uplink control region, whether to deliver an additional time delay and a specific length of the additional time delay to the user equipment for the downlink data packet, to indicate a location of a subframe for the user equipment to feed back the ACK/NACK information corresponding to the downlink data packet. It may be understood that, if a result of the determining is that a time for feeding back the ACK/NACK information for the downlink data packet does not need to be additionally delayed, the additional time delay may be set to zero. If a result of the determining is that a time for feeding back the ACK/NACK information for the downlink data packet needs to be additionally delayed, the additional time delay may be set to duration of one or more subframes, to instruct the user equipment to feed back the ACK/NACK information corresponding to the downlink data packet after an additional delay of the one or more subframes plus the basic time delay.

The processing capability information of the user equipment is obtained, and the basic time delay is calculated based on the processing capability information and the data information corresponding to the downlink data packet, so that a wait time of the user equipment from receiving the downlink data packet to feeding back the ACK/NACK information can be shortened based on the basic time delay, thereby increasing an ACK/a NACK information feedback speed of the user equipment, and reducing the communication latency. In addition, the additional time delay is delivered to the user equipment for the downlink data packet, so that the location of the subframe for the user equipment to feed back the ACK/NACK information corresponding to the downlink data packet can be flexibly indicated based on the service priority of the downlink data packet, the amount of the ACK/NACK information transmitted in the uplink control region in the subframe corresponding to the basic time delay, and the capacity of the uplink control region, to meet priority requirements of different services and balance service load.

In an implementation, the obtaining processing capability information that is reported by user equipment includes:
dividing a set of all available preambles in a random access procedure into multiple sequence groups, where each sequence group corresponds to one processing capability level;
receiving a preamble that is sent by the user equipment in the random access procedure, and determining a sequence group in which the preamble is located; and
obtaining the processing capability information of the user equipment based on the sequence group in which the preamble is located.

Specifically, the eNB may divide all available preambles allocated to each cell into multiple sequence groups. Each sequence group corresponds to one processing capability level. Correspondingly, UEs may report their processing capabilities to the eNB in a random access procedure by using different preambles. Assuming that the processing capabilities of the UEs are classified into four levels: a level 0, a level 1, a level 2, and a level 3, 256 available preambles need to be allocated to each cell. The 256 preambles are divided into four sequence groups 0, 1, 2, and 3, and each sequence group corresponds to one processing capability level, as shown in Table 1. Specifically, preambles 0 to 63 correspond to the level 0, preambles 64 to 127 correspond to the level 1, preambles 128 to 171 correspond to the level 2, and preambles 172 to 255 correspond to the level 3. During blind detection on preambles, the eNB can learn of a processing capability level of UE by detecting a sequence group in which a preamble used by the UE is located.

TABLE 1

Processing capability levels corresponding to different preambles

| Sequence group | Preamble | Processing capability level |
| --- | --- | --- |
| 0 | 0-63 | 0 |
| 1 | 64-127 | 1 |
| 2 | 128-171 | 2 |
| 3 | 172-255 | 3 |

It may be understood that, UEs report their processing capabilities to the eNB in a random access procedure by using different preambles, so that each time downlink data is transmitted, both the UE and the eNB can separately determine a basic time delay needed by the UE to feed back ACK/NACK information corresponding to a downlink data packet. Because the ACK/NACK information is implicitly carried in a preamble that is sent in the random access procedure, no additional information needs to be exchanged, thereby reducing signaling load and overheads. In addition, the UE can feed back the ACK/NACK information as soon as possible based on its processing capability, to reduce the communication latency.

In an implementation, the obtaining processing capability information that is reported by user equipment includes:
receiving Msg3 that is sent by the user equipment in a random access procedure, where Msg3 includes a newly-added field used to carry the processing capability information;
reading a bit value of the newly-added field in Msg3, where the bit value is used to represent the processing capability level of the user equipment; and
obtaining the processing capability information of the user equipment based on the bit value of the newly-added field in Msg3.

Specifically, UEs may report their processing capability information in a random access procedure by using different bit values in a newly-added field in Msg3. As shown in Table 2, assuming that processing capability levels of the UEs are classified into four levels: a level 0, a level 1, a level 2, and a level 3, a two-bit newly-added field may be added to Msg3 to report the processing capability information of the UE.

TABLE 2

Processing capability levels corresponding to different bit values in the newly-added field in Msg3

| Bit value | Processing capability level |
| --- | --- |
| 00 | 0 |
| 01 | 1 |
| 10 | 2 |
| 11 | 3 |

When the processing capability level of the UE is 0, the bit value of the newly-added field in Msg3 is set to 00.

When the processing capability level of the UE is 1, the bit value of the newly-added field in Msg3 is set to 01.

When the processing capability level of the UE is 2, the bit value of the newly-added field in Msg3 is set to 10.

When the processing capability level of the UE is 3, the bit value of the newly-added field in Msg3 is set to 11.

It may be understood that, the UE reports processing capability information to the eNB by adding a field to Msg3 in the random access procedure, so that each time downlink data is transmitted, both the UE and the eNB can separately determine a basic time delay needed by the UE to feed back ACK/NACK information corresponding to a downlink data packet. The processing capability information can be reported by adding only a two-bit field to Msg3, so that signaling overheads are relatively low and implementation is convenient. In addition, the UE can feed back the ACK/NACK information as soon as possible based on its processing capability, to reduce the communication latency.

In 5G NR communication, based on a downlink self-contained subframe structure shown in FIG. 4A, ACK/NACK information corresponding to downlink data sent in multiple different subframes may be transmitted in an uplink control region (UL control region) in a same subframe. However, because a UL control region, in a subframe, used to transmit ACK/NACK information has a limited capacity, when excessive ACK/NACK information needs to be transmitted in a UL control region in a same subframe, the capacity is certainly insufficient. Therefore, some ACK/NACK information needs to be sent after an additional delay time. In this embodiment, the additional time delay is determined based on the service priority corresponding to the downlink data packet, the amount of the ACK/NACK information transmitted in the uplink control region in the subframe corresponding to the basic time delay, and the capacity of the uplink control region together. The subframe corresponding to the basic time delay is a subframe that is closest to a time interval of a subframe for transmitting the downlink data packet and that is not less than the basic time delay.

Figure 7A:
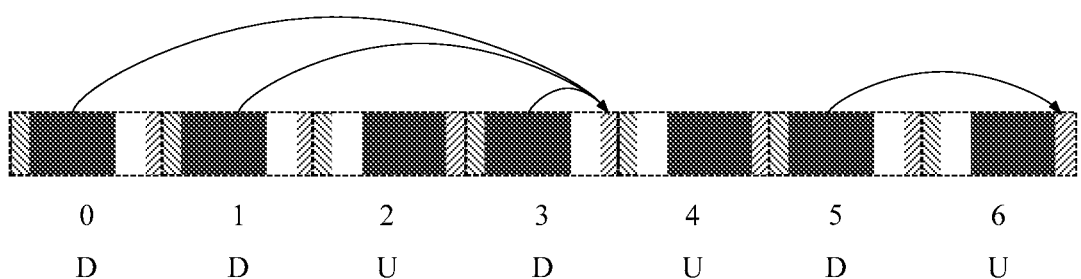
FIG. 7A to FIG. 7C are schematic comparison diagrams of ACK/NACK information feedback locations in a method for feeding back ACK/NACK information for downlink data according to an embodiment of the present invention.
Figure 7B:
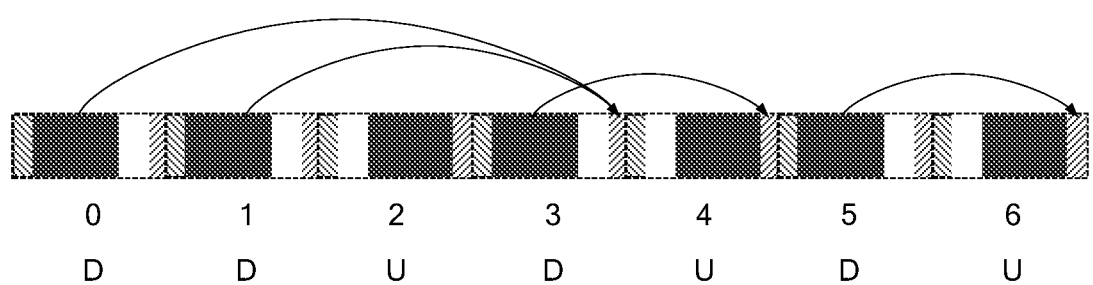
Figure 7C:
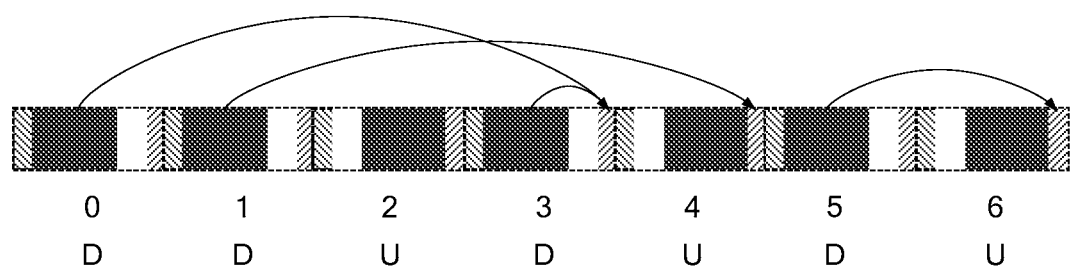

Referring to FIG. 7A, D represents a downlink subframe, U represents an uplink subframe, and 0 to 6 are sequence numbers of subframes. It is assumed that in a plan, ACK/NACK information corresponding to downlink data packets transmitted in a subframe 0, a subframe 1, and a subframe 3 should all be sent in a UL control region in the subframe 3. When excessive downlink transmission code words are scheduled in the subframe 0, the subframe 1, and the subframe 3, a limited capacity of the UL control region in the subframe 3 possibly is not enough to simultaneously carry excessive ACK/NACK information. Therefore, sending of ACK/NACK information corresponding to a downlink data packet sent in the subframe 3 may be additionally delayed, and the ACK/NACK information is sent in a UL control region in a subframe 4, as shown in FIG. 7B. Alternatively, sending of ACK/NACK information corresponding to a downlink data packet sent in the subframe 0 or the subframe 1 may be additionally delayed, and the ACK/NACK information is sent in a UL control region in a subframe 4, as shown in FIG. 7C. A specific time (namely, the additional time delay) for which the sending of the ACK/NACK information is additionally delayed is determined by the eNB based on service priorities that correspond to the downlink data packets transmitted in the subframe 0, the subframe 1, and the subframe 3 and delay requirements of the corresponding data packets in transmission processes, and then delivered to corresponding user equipment.

In an implementation, the delivering an additional time delay to the user equipment for the downlink data packet includes:

adding, to downlink control information (Downlink Control Information, DCI) for the downlink data packet, a field used to carry the additional time delay;

presetting, for the newly-added field in the downlink control information DCI, a bit value used to represent the corresponding additional time delay; and delivering the additional time delay to the user equipment by using the bit value of the newly-added field in the downlink control information DCI.

Specifically, when scheduling downlink data in various subframes, the eNB may add a new additional field to downlink control information DCI for the downlink data, to indicate, by using different bit values of the newly-added field, an additional time delay needed by ACK/NACK information corresponding to downlink data in a current subframe. As shown in Table 3, assuming that there are four different additional time delays, which are respectively 0 subframes, 1 subframe, 2 subframes, and 3 subframes, the eNB may add a two-bit newly-added field to the downlink control information DCI for the downlink data packet to deliver the additional time delay to the corresponding user equipment.

TABLE 3

Additional time delays corresponding to different bit values of the newly-added field in the DCI

| Bit value | Additional time delay (unit: subframes) |
|---|---|
| 00 | 0 |
| 01 | 1 |
| 10 | 2 |
| 11 | 3 |

When the additional time delay is 0 subframes (that is, there is no additional delay), the bit value of the newly-added field in the DCI is set to 00.

When the additional time delay is 1 subframe, the bit value of the newly-added field in the DCI is set to 01.

When the additional time delay is 2 subframes, the bit value of the newly-added field in the DCI is set to 10.

When the additional time delay is 3 subframes, the bit value of the newly-added field in the DCI is set to 11.

For example, for a case shown in FIG. 7A, if the capacity of the UL control region in the subframe 3 cannot simultaneously carry excessive ACK/NACK information, the eNB may add a two-bit field to DCI for the downlink data packet corresponding to the subframe 3, and set a bit value of the newly-added field to 01 to instruct user equipment to feed back the ACK/NACK information corresponding to the downlink data packet after an additional delay of one subframe plus the basic time delay. In other words, sending of the ACK/NACK information corresponding to the downlink data packet sent in the subframe 3 is delayed, and the ACK/NACK information is fed back in the UL control region in the subframe 4.

In this embodiment, the eNB dynamically indicates an additional time delay of the UE by using DCI, so that an ACK/a NACK information sending time can be more flexibly arranged to resolve a problem about an insufficient capacity of a UL control region, and meet requirements of various service loads and different deployment scenarios.

In an implementation, the delivering an additional time delay to the user equipment for the downlink data packet includes:

adding, to radio resource control (Radio Resource Control, RRC) signaling for the downlink data packet, a field used to carry the additional time delay;

presetting, for the newly-added field in the radio resource control RRC signaling, a bit value used to represent the corresponding additional time delay; and delivering the additional time delay to the user equipment by using the bit value of the newly-added field in the radio resource control RRC signaling.

Specifically, the eNB may alternatively add a field to radio resource control RRC signaling for the downlink data packet, to carry the additional time delay. For example, it is assumed that a service (corresponding to the downlink data packet transmitted in the subframe 3) for UE scheduled in the subframe 3 in FIG. 7A does not have a strict delay requirement, the ACK/NACK information does not need to be immediately fed back in the current subframe, and a delay requirement of the current service can still be met when the ACK/NACK information is fed back in a next subframe. To reduce transmit power of the UL control region in the subframe 3, the eNB may perform configuration by using RRC signaling, so that the UE in the subframe 3 feeds back the ACK/NACK information corresponding to the downlink data packet after an additional 1-subframe time delay.

In this embodiment, the eNB dynamically indicates an additional time delay of the UE by using RRC signaling, so that an ACK/a NACK information sending time can be dynamically arranged based on different scenarios, thereby balancing signaling load.

In an implementation, the delivering an additional time delay to the user equipment for the downlink data packet includes:

adding, to system information for the downlink data packet, a field used to carry the additional time delay;

presetting, for the newly-added field in the system information, a bit value used to represent the corresponding additional time delay; and delivering the additional time delay to the user equipment by using the bit value of the newly-added field in the system information.

Specifically, in some cases, if the ACK/NACK information does not need to be fast fed back for service scenarios of all UEs served by the eNB, that is, none of the UEs need to feed back ACK/NACK information at their highest processing speeds, the eNB may instruct, in system information (for example, a MIB or a SIB), different UEs to respectively feed back the ACK/NACK information after different additional delays, so that an ACK/a NACK information sending time can be arranged based on different scenarios, thereby dynamically adapting to different service loads.

It may be understood that, the eNB adds, to the downlink control information DCI, the RRC signaling, or the system information for the downlink data packet, a field used to carry the additional time delay, and delivers the additional time delay to the user equipment by using the bit value of the newly-added field, so that when the amount of the ACK/NACK information transmitted in the uplink control region in the subframe corresponding to the basic time delay exceeds the capacity of the uplink control region, the UE can be instructed based on the service priority corresponding to the downlink data packet to feed back the ACK/NACK information corresponding to the downlink data packet after the additional time delay plus the basic time delay, to effectively resolve a problem about an ACK/a NACK information transmission failure arising from an insufficient capacity of the uplink control region. In addition, as the additional time delay is delivered to the user equipment for the downlink data packet, the location of the subframe for feeding back the ACK/NACK information can be further flexibly indicated based on a channel load, to meet different service priority requirements and balance channel load.

In an implementation, if the amount of the ACK/NACK information transmitted in the uplink control region in the subframe corresponding to the basic time delay is greater than the capacity of the uplink control region, and the service priority corresponding to the downlink data packet is higher than service priorities of other downlink data packets corresponding to ACK/NACK information transmitted in the uplink control region, the additional time delay corresponding to the downlink data packet is set to zero, and an additional time delay corresponding to any one or more downlink data packets in the other downlink data packets is set to duration of at least one subframe.

Specifically, the eNB may select UEs each to undergo an additional delay according to different rules. For example, in the embodiment shown in FIG. 7A, if the eNB uses a rule of "determining an additional delay based on a service type", and a service priority of the downlink data packet sent in the subframe 3 is higher than service priorities of downlink data packets sent in the subframe 0 and the subframe 1, ACK/NACK information needs to be returned as soon as possible for the downlink data packet sent in the subframe 3. Therefore, sending of an ACK/a NACK for the downlink data packet is not additionally delayed. In other words, an additional time delay corresponding to the downlink data packet sent in the subframe 3 is set to zero. Moreover, sending of ACK/NACK information corresponding to the downlink data packet sent in the subframe 1 may be additionally delayed. In other words, an additional time delay corresponding to the downlink data packet sent in the subframe 1 is set to one subframe. A final scheduling result is shown in FIG. 7C, that is, sending of the ACK/NACK information corresponding to the downlink data packet sent in the subframe 1 is additionally delayed, and the ACK/NACK information is sent in the UL control region in the subframe 4.

In an implementation, if the amount of the ACK/NACK information transmitted in the uplink control region in the subframe corresponding to the basic time delay is greater than the capacity of the uplink control region, the service priority corresponding to the downlink data packet is equal to a service priority of another downlink data packet corresponding to ACK/NACK information transmitted in the uplink control region, and a time for transmitting the downlink data packet is the latest, the additional time delay corresponding to the downlink data packet is set to duration of at least one subframe, and an additional time delay corresponding to the another downlink data packet is set to zero.

Specifically, the eNB may select UEs each to undergo an additional delay according to different rules. For example, in the embodiment shown in FIG. 7A, if the eNB uses a rule of "minimizing a maximum delay", in order that a priority of additionally delaying the ACK/NACK information corresponding to the downlink data packet sent in the subframe 3 is higher than a priority of additionally delaying the ACK/NACK information corresponding to the downlink data packet sent in the subframe 0 or the subframe 1, additional time delays corresponding to the downlink data packets sent in the subframe 0 and the subframe 1 are set to zero, and an additional time delay corresponding to the downlink data packet sent in the subframe 3 is set to one subframe. A final scheduling result is shown in FIG. 7B, that is, sending of the ACK/NACK information corresponding to the downlink data packet sent in the subframe 3 is additionally delayed, and the ACK/NACK information is sent in the UL control region in the subframe 4.

Figure 8:
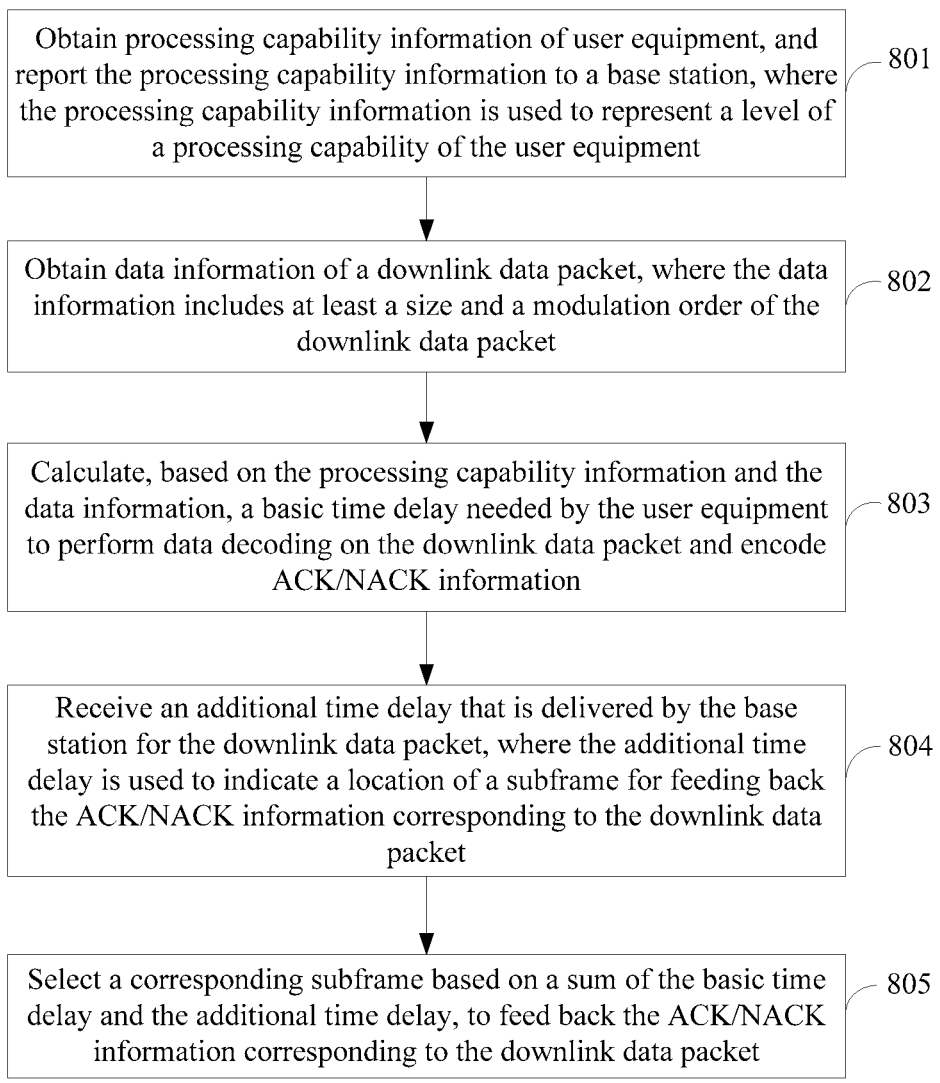
FIG. 8 is a second schematic flowchart of a method for feeding back ACK/NACK information for downlink data according to an embodiment of the present invention.

Referring to FIG. 8, an embodiment of the present invention provides a method for feeding back ACK/NACK information for downlink data, including the following steps:

Step 801: Obtain processing capability information of user equipment, and report the processing capability information to a base station, where the processing capability information is used to represent a level of a processing capability of the user equipment.

Step 802: Obtain data information of a downlink data packet, where the data information includes at least a size and a modulation order of the downlink data packet.

Step 803: Calculate, based on the processing capability information and the data information, a basic time delay needed by the user equipment to perform data decoding on the downlink data packet and encode ACK/NACK information.

Step 804: Receive an additional time delay that is delivered by the base station for the downlink data packet, where the additional time delay is used to indicate a location of a subframe for feeding back the ACK/NACK information corresponding to the downlink data packet.

Step 805: Select a corresponding subframe based on a sum of the basic time delay and the additional time delay, to feed back the ACK/NACK information corresponding to the downlink data packet.

In an implementation, the reporting the processing capability information to a base station includes:
 dividing a set of all available preambles in a random access procedure into multiple sequence groups, where each sequence group corresponds to one processing capability level;
 selecting, as a preamble for the random access procedure, a preamble from a sequence group corresponding to the processing capability level of the user equipment; and
 reporting the processing capability information of the user equipment to the base station by using the preamble for the random access procedure.

In an implementation, the reporting the processing capability information to a base station includes:
 adding, to the Msg3 of a random access procedure, a field used to carry the processing capability information;
 presetting, for the newly-added field in Msg3 based on the processing capability information, a bit value used to represent the corresponding processing capability level; and
 reporting the processing capability information of the user equipment to the base station by using the bit value of the newly-added field in Msg3.

In an implementation, the receiving an additional time delay that is delivered by the base station for the downlink data packet includes:
 receiving downlink control information DCI that is delivered by the base station for the downlink data packet, where the DCI includes a newly-added field used to carry the additional time delay;
 reading a bit value of the newly-added field in the downlink control information DCI, where the bit value is used to represent the corresponding additional time delay; and obtaining, based on the bit value of the newly-added field in the downlink control information DCI, the additional time delay that is delivered by the base station for the downlink data packet.

In an implementation, the receiving an additional time delay that is delivered by the base station for the downlink data packet includes:
 receiving radio resource control RRC signaling that is delivered by the base station for the downlink data packet, where the radio resource control RRC signaling includes a newly-added field used to carry the additional time delay;
 reading a bit value of the newly-added field in the radio resource control RRC signaling, where the bit value is used to represent the corresponding additional time delay; and
 obtaining, based on the bit value of the newly-added field in the radio resource control RRC signaling, the additional time delay that is delivered by the base station for the downlink data packet.

In an implementation, the receiving an additional time delay that is delivered by the base station for the downlink data packet includes:
 receiving system information that is delivered by the base station for the downlink data packet, where the system information includes a newly-added field used to carry the additional time delay;
 reading a bit value of the newly-added field in the system information, where the bit value is used to represent the corresponding additional time delay; and
 obtaining, based on the bit value of the newly-added field in the system information, the additional time delay that is delivered by the base station for the downlink data packet.

In an implementation, the additional time delay is determined based on a service priority corresponding to the downlink data packet, an amount of ACK/NACK information transmitted in an uplink control region in a subframe corresponding to the basic time delay, and a capacity of the uplink control region together. The subframe corresponding to the basic time delay is a subframe that is closest to a time interval of a subframe for transmitting the downlink data packet and that is not less than the basic time delay.

In an implementation, if the amount of the ACK/NACK information transmitted in the uplink control region in the subframe corresponding to the basic time delay is greater than the capacity of the uplink control region, and the service priority corresponding to the downlink data packet is higher than service priorities of other downlink data packets corresponding to ACK/NACK information transmitted in the uplink control region, the additional time delay corresponding to the downlink data packet is set to zero, and an additional time delay corresponding to any one or more downlink data packets in the other downlink data packets is set to duration of at least one subframe.

In an implementation, if the amount of the ACK/NACK information transmitted in the uplink control region in the subframe corresponding to the basic time delay is greater than the capacity of the uplink control region, the service priority corresponding to the downlink data packet is equal to a service priority of another downlink data packet corresponding to ACK/NACK information transmitted in the uplink control region, and a time for transmitting the downlink data packet is the latest, the additional time delay corresponding to the downlink data packet is set to duration of at least one subframe, and an additional time delay corresponding to the another downlink data packet is set to zero.

It may be understood that, in this embodiment, the method for feeding back ACK/NACK information for downlink data may be performed by user equipment (User Equipment, UE), for example, a mobile phone or a tablet computer. Steps in the method in this embodiment correspond to steps in the method in the embodiment shown in FIG. 6. Therefore, for specific implementations of the steps in the method in this embodiment, refer to related descriptions of the method embodiment shown in FIG. 6. Details are not described herein again.

Figure 9:
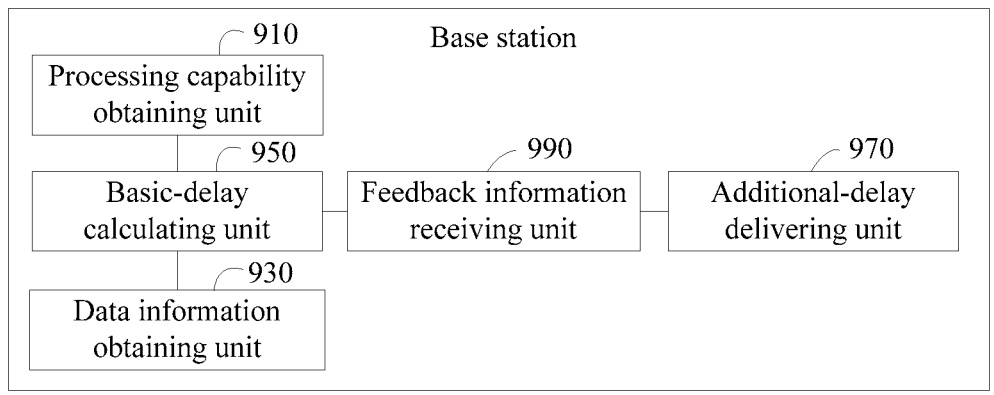
FIG. 9 is a first schematic structural diagram of a base station according to an embodiment of the present invention.

Referring to FIG. 9, an embodiment of the present invention provides a base station 900, including:
- a processing capability obtaining unit 910, configured to obtain processing capability information that is reported by user equipment, where the processing capability information is used to represent a level of a processing capability of the user equipment;
- a data information obtaining unit 930, configured to obtain data information of a downlink data packet, where the data information includes at least a size and a modulation order of the downlink data packet;
- a basic-delay calculating unit 950, configured to calculate, based on the processing capability information and the data information, a basic time delay needed by the user equipment to perform data decoding on the downlink data packet and encode ACK/NACK information;
- an additional-delay delivering unit 970, configured to deliver an additional time delay to the user equipment for the downlink data packet, where the additional time delay is used to indicate a location of a subframe for feeding back the ACK/NACK information corresponding to the downlink data packet; and
- a feedback information receiving unit 990, configured to select a corresponding subframe based on a sum of the basic time delay and the additional time delay, to receive the ACK/NACK information corresponding to the downlink data packet.

Figure 10A:
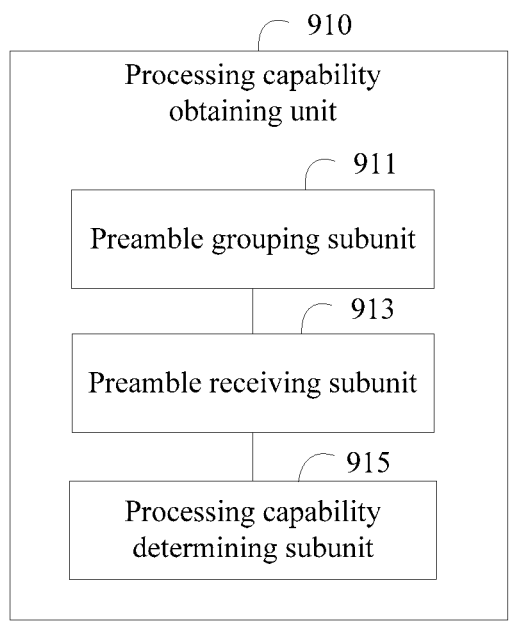
FIG. 10A and FIG. 10B are schematic structural diagrams of a processing capability obtaining unit of the base station shown in FIG. 9.

Referring to FIG. 10A, in an implementation, the processing capability obtaining unit 910 includes:
- a preamble grouping subunit 911, configured to divide a set of all available preambles in a random access procedure into multiple sequence groups, where each sequence group corresponds to one processing capability level;
- a preamble receiving subunit 913, configured to receive a preamble that is sent by the user equipment in the random access procedure, and determine a sequence group in which the preamble is located; and
- a processing capability determining subunit 915, configured to obtain the processing capability information of the user equipment based on the sequence group in which the preamble is located.

Figure 10B:
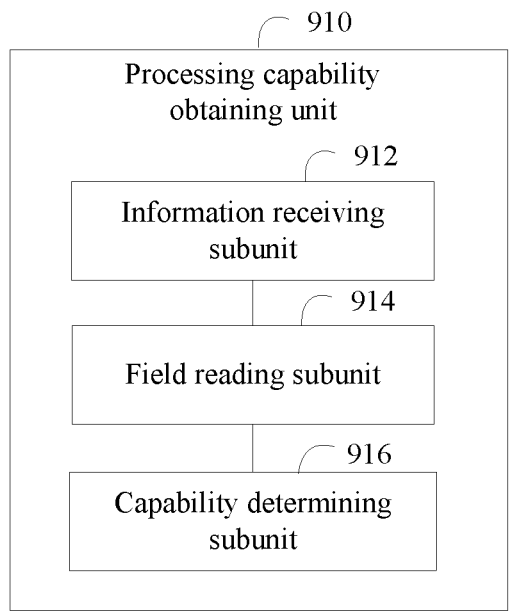

Referring to FIG. 10B, in an implementation, the processing capability obtaining unit 910 includes:
- an information receiving subunit 912, configured to receive Msg3 that is sent by the user equipment in a random access procedure, where Msg3 includes a newly-added field used to carry the processing capability information;
- a field reading subunit 914, configured to read a bit value of the newly-added field in Msg3, where the bit value is used to represent the processing capability level of the user equipment; and
- a capability determining subunit 916, configured to obtain the processing capability information of the user equipment based on the bit value of the newly-added field in Msg3.

Figure 10C:
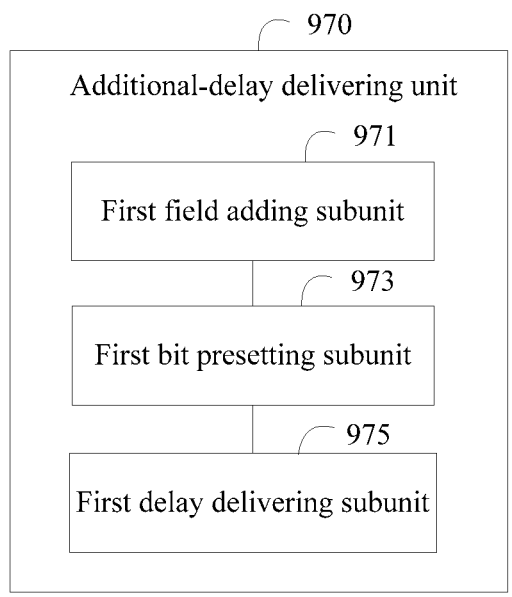
FIG. 10C to FIG. 10E are schematic structural diagrams of an additional-delay delivering unit of the base station shown in FIG. 9.

Referring to FIG. 10C, in an implementation, the additional-delay delivering unit 970 includes:
- a first field adding subunit 971, configured to add, to downlink control information DCI for the downlink data packet, a field used to carry the additional time delay;
- a first bit presetting subunit 973, configured to preset, for the newly-added field in the downlink control information DCI, a bit value used to represent the corresponding additional time delay; and
- a first delay delivering subunit 975, configured to deliver the additional time delay to the user equipment by using the bit value of the newly-added field in the downlink control information DCI.

Figure 10D:
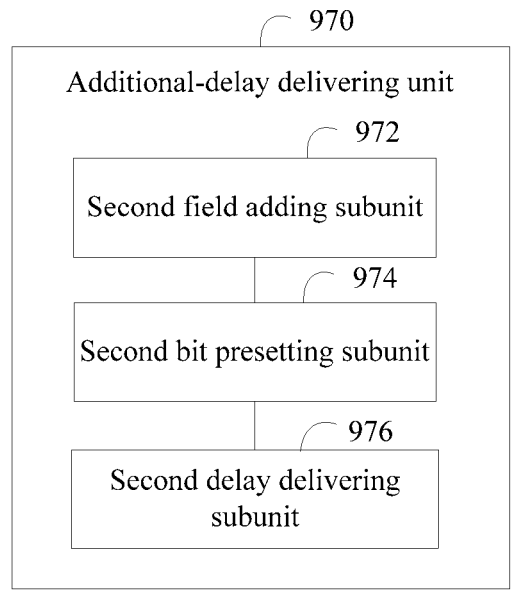

Referring to FIG. 10D, in an implementation, the additional-delay delivering unit 970 includes:
- a second field adding subunit 972, configured to add, to radio resource control RRC signaling for the downlink data packet, a field used to carry the additional time delay;
- a second bit presetting subunit 974, configured to preset, for the newly-added field in the radio resource control RRC signaling, a bit value used to represent the corresponding additional time delay; and
- a second delay delivering subunit 976, configured to deliver the additional time delay to the user equipment by using the bit value of the newly-added field in the radio resource control RRC signaling.

Figure 10E:
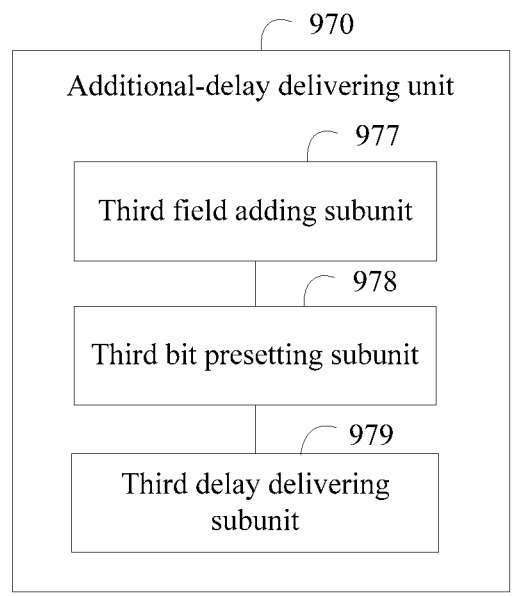

Referring to FIG. 10E, in an implementation, the additional-delay delivering unit 970 includes:
- a third field adding subunit 977, configured to add, to system information for the downlink data packet, a field used to carry the additional time delay;
- a third bit presetting subunit 978, configured to preset, for the newly-added field in the system information, a bit value used to represent the corresponding additional time delay; and
- a third delay delivering subunit 979, configured to deliver the additional time delay to the user equipment by using the bit value of the newly-added field in the system information.

It may be understood that, for functions and specific implementations of units of the base station 900, refer to related descriptions in the method embodiment shown in FIG. 6. Details are not described herein again.

Figure 11:
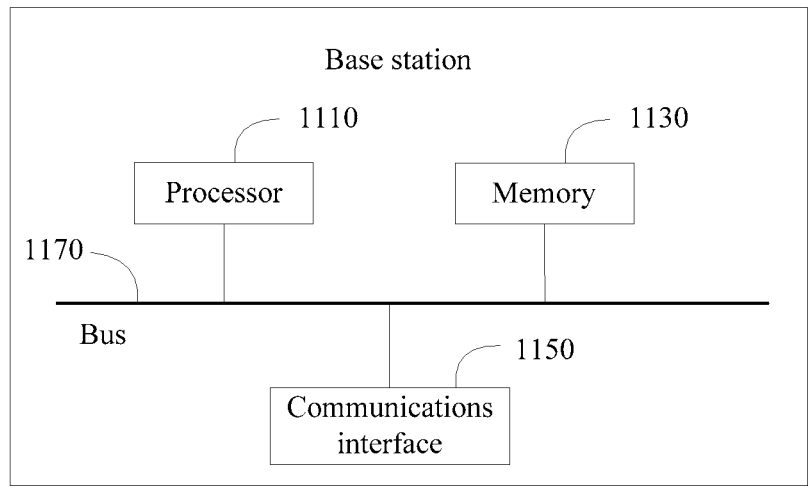
FIG. 11 is a second schematic structural diagram of a base station according to an embodiment of the present invention.

Referring to FIG. 11, in an embodiment of the present invention, a base station 1100 is provided, including at least one processor 1110, a memory 1130, a communications interface 1150, and a bus 1170. The at least one processor 1110, the memory 1130, and the communications interface 1150 are connected to and communicate with each other by using the bus 1170. The communications interface 1150 is configured to establish a communication connection to user equipment. The processor 1110 is configured to invoke executable program code stored in the memory 1130, to perform the following operations:

obtaining processing capability information that is reported by the user equipment, where the processing capability information is used to represent a level of a processing capability of the user equipment;

obtaining data information of a downlink data packet, where the data information includes at least a size and a modulation order of the downlink data packet;

calculating, based on the processing capability information and the data information, a basic time delay needed by the user equipment to perform data decoding on the downlink data packet and encode ACK/NACK information;

delivering an additional time delay to the user equipment for the downlink data packet, where the additional time delay is used to indicate a location of a subframe for feeding back the ACK/NACK information corresponding to the downlink data packet; and selecting a corresponding subframe based on a sum of the basic time delay and the additional time delay, to receive the ACK/NACK information corresponding to the downlink data packet.

In an implementation, the obtaining processing capability information that is reported by the user equipment includes:

dividing a set of all available preambles in a random access procedure into multiple sequence groups, where each sequence group corresponds to one processing capability level;

receiving a preamble that is sent by the user equipment in the random access procedure, and determining a sequence group in which the preamble is located; and obtaining the processing capability information of the user equipment based on the sequence group in which the preamble is located.

In an implementation, the obtaining processing capability information that is reported by the user equipment includes:

receiving Msg3 that is sent by the user equipment in a random access procedure, where Msg3 includes a newly-added field used to carry the processing capability information;

reading a bit value of the newly-added field in Msg3, where the bit value is used to represent the processing capability level of the user equipment; and obtaining the processing capability information of the user equipment based on the bit value of the newly-added field in Msg3.

In an implementation, the delivering an additional time delay to the user equipment for the downlink data packet includes:

adding, to downlink control information DCI for the downlink data packet, a field used to carry the additional time delay;

presetting, for the newly-added field in the downlink control information DCI, a bit value used to represent the corresponding additional time delay; and delivering the additional time delay to the user equipment by using the bit value of the newly-added field in the downlink control information DCI.

In an implementation, the delivering an additional time delay to the user equipment for the downlink data packet includes:

adding, to radio resource control RRC signaling for the downlink data packet, a field used to carry the additional time delay;

presetting, for the newly-added field in the radio resource control RRC signaling, a bit value used to represent the corresponding additional time delay; and delivering the additional time delay to the user equipment by using the bit value of the newly-added field in the radio resource control RRC signaling.

In an implementation, the delivering an additional time delay to the user equipment for the downlink data packet includes:

adding, to system information for the downlink data packet, a field used to carry the additional time delay;

presetting, for the newly-added field in the system information, a bit value used to represent the corresponding additional time delay; and delivering the additional time delay to the user equipment by using the bit value of the newly-added field in the system information.

In an implementation, the additional time delay is determined based on a service priority corresponding to the downlink data packet, an amount of ACK/NACK information transmitted in an uplink control region in a subframe corresponding to the basic time delay, and a capacity of the uplink control region together. The subframe corresponding to the basic time delay is a subframe that is closest to a time interval of a subframe for transmitting the downlink data packet and that is not less than the basic time delay.

In an implementation, if the amount of the ACK/NACK information transmitted in the uplink control region in the subframe corresponding to the basic time delay is greater than the capacity of the uplink control region, and the service priority corresponding to the downlink data packet is higher than service priorities of other downlink data packets corresponding to ACK/NACK information transmitted in the uplink control region, the additional time delay corresponding to the downlink data packet is set to zero, and an additional time delay corresponding to any one or more downlink data packets in the other downlink data packets is set to duration of at least one subframe.

In an implementation, if the amount of the ACK/NACK information transmitted in the uplink control region in the subframe corresponding to the basic time delay is greater than the capacity of the uplink control region, the service priority corresponding to the downlink data packet is equal to a service priority of another downlink data packet corresponding to ACK/NACK information transmitted in the uplink control region, and a time for transmitting the downlink data packet is the latest, the additional time delay corresponding to the downlink data packet is set to duration of at least one subframe, and an additional time delay corresponding to the another downlink data packet is set to zero.

It may be understood that, for specific implementations of the foregoing operation steps performed by the processor 1110, refer to related descriptions in the method embodiment shown in FIG. 6. Details are not described herein again.

Figure 12:
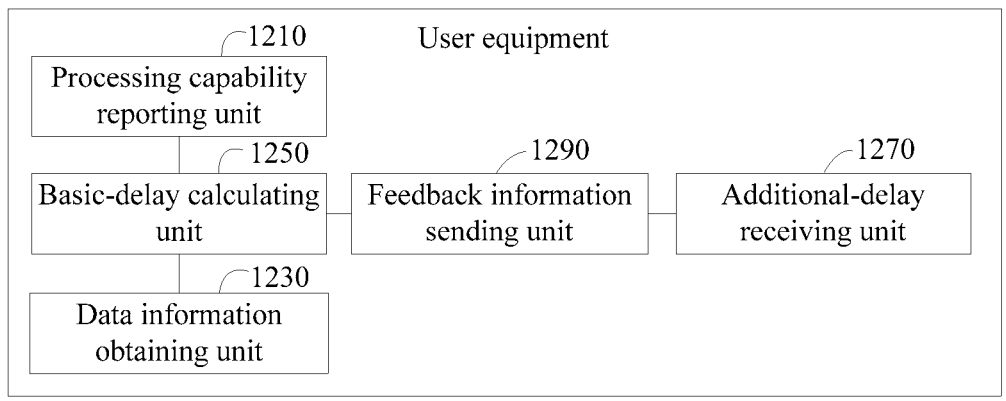
FIG. 12 is a first schematic structural diagram of user equipment according to an embodiment of the present invention.

Referring to FIG. 12, an embodiment of the present invention provides user equipment 1200, including:

a processing capability reporting unit 1210, configured to obtain processing capability information of the user equipment, and report the processing capability information to a base station, where the processing capability information is used to represent a level of a processing capability of the user equipment;

a data information obtaining unit 1230, configured to obtain data information of a downlink data packet, where the data information includes at least a size and a modulation order of the downlink data packet;

a basic-delay calculating unit 1250, configured to calculate, based on the processing capability information and the data information, a basic time delay needed by the user equipment to perform data decoding on the downlink data packet and encode ACK/NACK information;

an additional-delay receiving unit 1270, configured to receive an additional time delay that is delivered by the base station for the downlink data packet, where the additional time delay is used to indicate a location of a subframe for feeding back the ACK/NACK information corresponding to the downlink data packet; and a feedback information sending unit 1290, configured to select a corresponding subframe based on a sum of the basic time delay and the additional time delay, to feed back the ACK/NACK information corresponding to the downlink data packet.

Figure 13A:
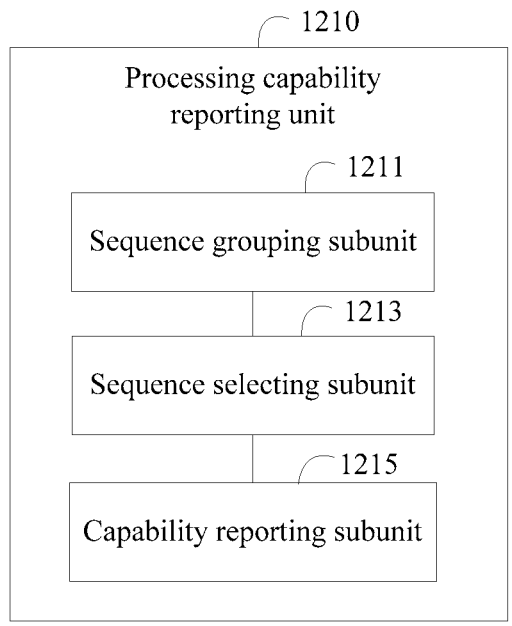
FIG. 13A and FIG. 13B are schematic structural diagrams of a processing capability reporting unit of the user equipment shown in FIG. 12.

Referring to FIG. 13A, in an implementation, the processing capability reporting unit 1210 includes:
- a sequence grouping subunit 1211, configured to divide a set of all available preambles in a random access procedure into multiple sequence groups, where each sequence group corresponds to one processing capability level;
- a sequence selecting subunit 1213, configured to select, as a preamble for the random access procedure, a preamble from a sequence group corresponding to the processing capability level of the user equipment;
- a capability reporting subunit 1215, configured to report the processing capability information of the user equipment to the base station by using the preamble for the random access procedure.

Figure 13B:
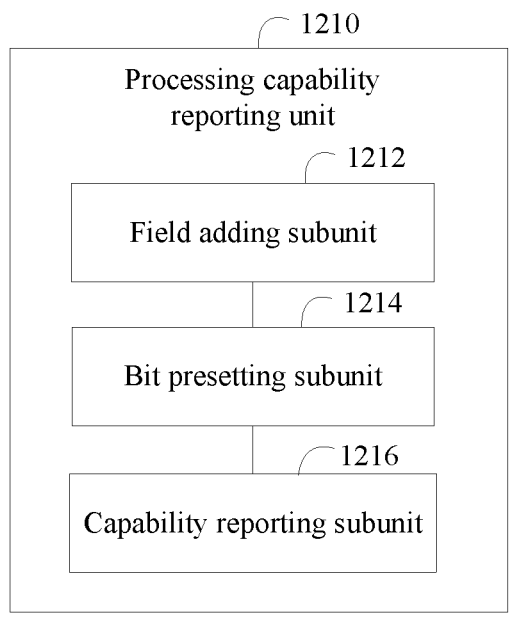

Referring to FIG. 13B, in an implementation, the processing capability reporting unit 1210 includes:
- a field adding subunit 1212, configured to add, to the Msg3 of a random access procedure, a field used to carry the processing capability information;
- a bit presetting subunit 1214, configured to preset, for the newly-added field in Msg3 based on the processing capability information, a bit value used to represent the corresponding processing capability level; and
- a capability reporting subunit 1216, configured to report the processing capability information of the user equipment to the base station by using the bit value of the newly-added field in Msg3.

Figure 13C:
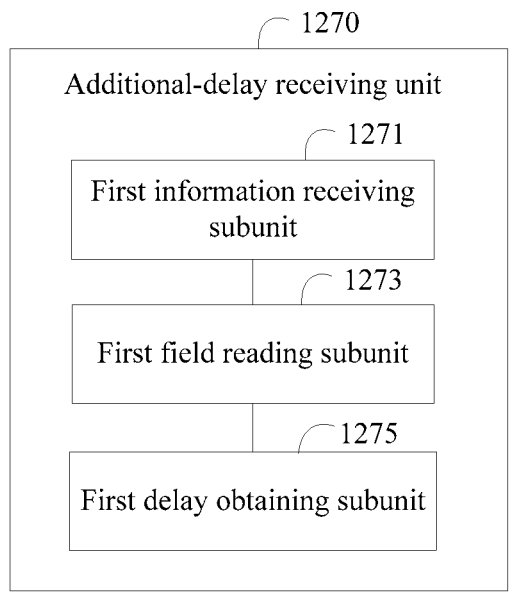
FIG. 13C to FIG. 13E are schematic structural diagrams of an additional-delay receiving unit of the user equipment shown in FIG. 12.

Referring to FIG. 13C, in an implementation, the additional-delay receiving unit 1270 includes:
- a first information receiving subunit 1271, configured to receive downlink control information DCI that is delivered by the base station for the downlink data packet, where the DCI includes a newly-added field used to carry the additional time delay;
- a first field reading subunit 1273, configured to read a bit value of the newly-added field in the downlink control information DCI, where the bit value is used to represent the corresponding additional time delay; and
- a first delay obtaining subunit 1275, configured to obtain, based on the bit value of the newly-added field in the downlink control information DCI, the additional time delay that is delivered by the base station for the downlink data packet.

Figure 13D:
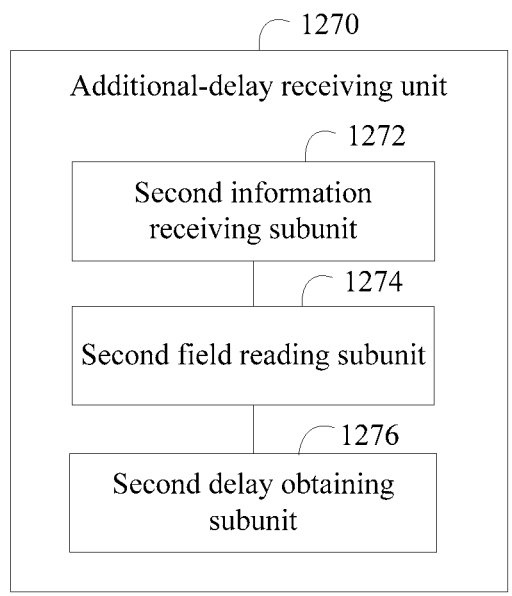

Referring to FIG. 13D, in an implementation, the additional-delay receiving unit 1270 includes:
- a second information receiving subunit 1272, configured to receive radio resource control RRC signaling that is delivered by the base station for the downlink data packet, where the radio resource control RRC signaling includes a newly-added field used to carry the additional time delay;
- a second field reading subunit 1274, configured to read a bit value of the newly-added field in the radio resource control RRC signaling, where the bit value is used to represent the corresponding additional time delay; and
- a second delay obtaining subunit 1276, configured to obtain, based on the bit value of the newly-added field in the radio resource control RRC signaling, the additional time delay that is delivered by the base station for the downlink data packet.

Figure 13E:
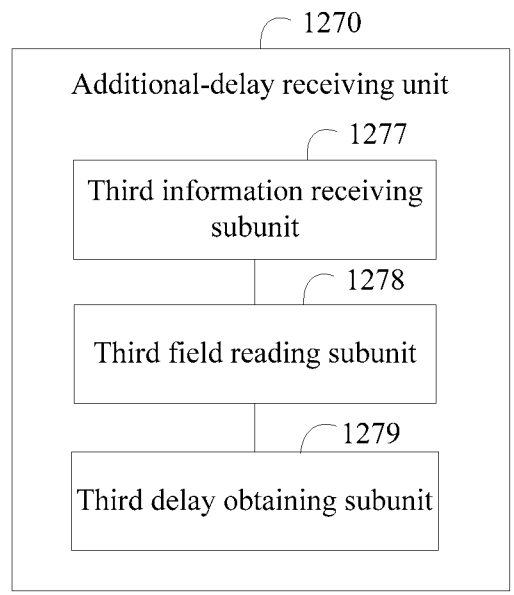

Referring to FIG. 13E, in an implementation, the additional-delay receiving unit 1270 includes:
- a third information receiving subunit 1277, configured to receive system information that is delivered by the base station for the downlink data packet, where the system information includes a newly-added field used to carry the additional time delay;
- a third field reading subunit 1278, configured to read a bit value of the newly-added field in the system information, where the bit value is used to represent the corresponding additional time delay; and
- a third delay obtaining subunit 1279, configured to obtain, based on the bit value of the newly-added field in the system information, the additional time delay that is delivered by the base station for the downlink data packet.

It may be understood that, for functions and specific implementations of units of the user equipment 1200, refer to related descriptions of the method embodiments shown in FIG. 6 and FIG. 8. Details are not described herein again.

Figure 14:
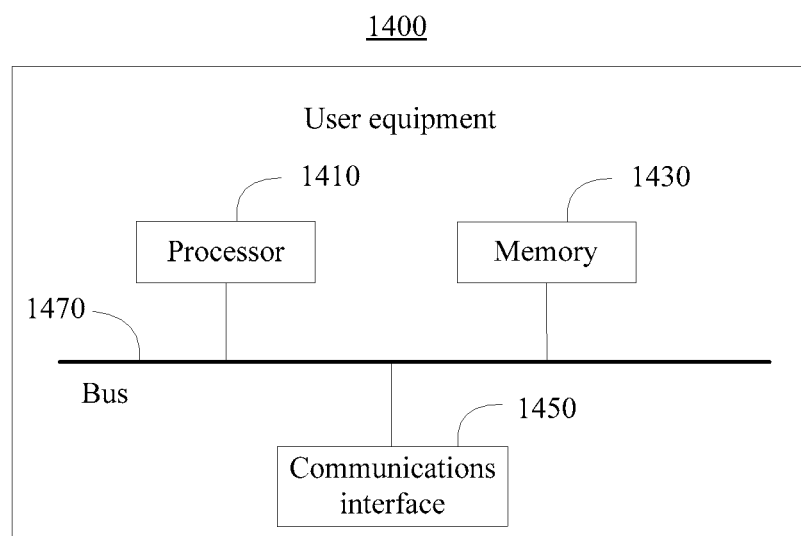
FIG. 14 is a second schematic structural diagram of user equipment according to an embodiment of the present invention

Referring to FIG. 14, an embodiment of the present invention provides user equipment 1400, including at least one processor 1410, a memory 1430, a communications interface 1450, and a bus 1470. The at least one processor 1410, the memory 1430, and the communications interface 1450 are connected to and communicate with each other by using the bus 1470. The communications interface 1450 is configured to establish a communication connection to a base station. The processor 1410 is configured to invoke executable program code stored in the memory 1430, to perform the following operations:
- obtaining processing capability information of the user equipment, and reporting the processing capability information to the base station, where the processing capability information is used to represent a level of a processing capability of the user equipment;
- obtaining data information of a downlink data packet, where the data information includes at least a size and a modulation order of the downlink data packet;
- calculating, based on the processing capability information and the data information, a basic time delay needed by the user equipment to perform data decoding on the downlink data packet and encode ACK/NACK information;
- receiving an additional time delay that is delivered by the base station for the downlink data packet, where the additional time delay is used to indicate a location of a subframe for feeding back the ACK/NACK information corresponding to the downlink data packet; and
- selecting a corresponding subframe based on a sum of the basic time delay and the additional time delay, to feed back the ACK/NACK information corresponding to the downlink data packet.

In an implementation, the reporting the processing capability information to the base station includes:
- dividing a set of all available preambles in a random access procedure into multiple sequence groups, where each sequence group corresponds to one processing capability level;
- selecting, as a preamble for the random access procedure, a preamble from a sequence group corresponding to the processing capability level of the user equipment;
- reporting the processing capability information of the user equipment to the base station by using the preamble for the random access procedure.

In an implementation, the reporting the processing capability information to the base station includes:
adding, to the Msg3 of a random access procedure, a field used to carry the processing capability information;
presetting, for the newly-added field in Msg3 based on the processing capability information, a bit value used to represent the corresponding processing capability level; and
reporting the processing capability information of the user equipment to the base station by using the bit value of the newly-added field in Msg3.

In an implementation, the receiving an additional time delay that is delivered by the base station for the downlink data packet includes:
receiving downlink control information DCI that is delivered by the base station for the downlink data packet, where the DCI includes a newly-added field used to carry the additional time delay;
reading a bit value of the newly-added field in the downlink control information DCI, where the bit value is used to represent the corresponding additional time delay; and
obtaining, based on the bit value of the newly-added field in the downlink control information DCI, the additional time delay that is delivered by the base station for the downlink data packet.

In an implementation, the receiving an additional time delay that is delivered by the base station for the downlink data packet includes:
receiving radio resource control RRC signaling that is delivered by the base station for the downlink data packet, where the radio resource control RRC signaling includes a newly-added field used to carry the additional time delay;
reading a bit value of the newly-added field in the radio resource control RRC signaling, where the bit value is used to represent the corresponding additional time delay; and
obtaining, based on the bit value of the newly-added field in the radio resource control RRC signaling, the additional time delay that is delivered by the base station for the downlink data packet.

In an implementation, the receiving an additional time delay that is delivered by the base station for the downlink data packet includes:
receiving system information that is delivered by the base station for the downlink data packet, where the system information includes a newly-added field used to carry the additional time delay;
reading a bit value of the newly-added field in the system information, where the bit value is used to represent the corresponding additional time delay; and
obtaining, based on the bit value of the newly-added field in the system information, the additional time delay that is delivered by the base station for the downlink data packet.

In an implementation, the additional time delay is determined based on a service priority corresponding to the downlink data packet, an amount of ACK/NACK information transmitted in an uplink control region in a subframe corresponding to the basic time delay, and a capacity of the uplink control region together. The subframe corresponding to the basic time delay is a subframe that is closest to a time interval of a subframe for transmitting the downlink data packet and that is not less than the basic time delay.

In an implementation, if the amount of the ACK/NACK information transmitted in the uplink control region in the subframe corresponding to the basic time delay is greater than the capacity of the uplink control region, and the service priority corresponding to the downlink data packet is higher than service priorities of other downlink data packets corresponding to ACK/NACK information transmitted in the uplink control region, the additional time delay corresponding to the downlink data packet is set to zero, and an additional time delay corresponding to any one or more downlink data packets in the other downlink data packets is set to duration of at least one subframe.

In an implementation, if the amount of the ACK/NACK information transmitted in the uplink control region in the subframe corresponding to the basic time delay is greater than the capacity of the uplink control region, the service priority corresponding to the downlink data packet is equal to a service priority of another downlink data packet corresponding to ACK/NACK information transmitted in the uplink control region, and a time for transmitting the downlink data packet is the latest, the additional time delay corresponding to the downlink data packet is set to duration of at least one subframe, and an additional time delay corresponding to the another downlink data packet is set to zero.

It may be understood that, for specific implementations of the foregoing operation steps performed by the processor 1410, refer to related descriptions in the method embodiment shown in FIG. 6 and FIG. 8. Details are not described herein again.

It may be understood that, in the embodiments provided of the present invention, the disclosed method and device may be implemented in other manners. For example, the described device embodiments are merely examples. The unit division is merely logical function division and may be other division in actual implementation. For example, multiple units may be combined or integrated into another system, or some features may be ignored or not performed. In an implementation, the device is stored in the memory in a form of an executable program module, and invoked and executed by the processor to implement corresponding functions.

It may be understood that a sequence of the steps of the method in the embodiments of the present invention may be adjusted, and some steps may be combined or deleted based on an actual requirement. Correspondingly, the units in the device in the embodiments of the present invention may be combined, divided, or deleted based on an actual requirement.

The foregoing disclosed embodiments are merely example embodiments of the present invention, and certainly are not intended to limit the protection scope of the present invention. A person of ordinary skill in the art may understand that all or some of processes that implement the foregoing embodiments and equivalent variations made in accordance with the claims of the present invention shall fall within the scope of the present invention.

What is claimed is:
1. A method for transmitting positive acknowledgement (ACK)/negative acknowledgement (NACK) (ACK/NACK) information for data, comprising:
dividing, by a user equipment, a set of all available preamble sequences in a random access process into a plurality of sequence groups, wherein each sequence group of the plurality of sequence groups includes a plurality of preamble sequences, and wherein each preamble sequence in a same sequence group corresponds to a same processing capability level;

selecting, by the user equipment for the random access process, a preamble sequence from a sequence group of the plurality of sequence groups, wherein the sequence group corresponds to a processing capability level of the user equipment;

sending, by the user equipment to a base station, processing capability information of the user equipment by using the selected preamble sequence, wherein the processing capability information of the user equipment represents the processing capability level of the user equipment;

receiving, by the user equipment, a data packet from the base station;

receiving, by the user equipment, downlink control information (DCI) for the data packet from the base station, wherein the DCI comprises a field used to instruct a first delay to be used by the user equipment to send ACK/NACK information corresponding to the data packet, and wherein the first delay is associated with a scheduling requirement or a service priority corresponding to the data packet;

acquiring, by the user equipment, data information of the data packet;

computing, by the user equipment, a second delay by using the processing capability information of the user equipment and the data information of the data packet; and determining, by the user equipment based on the first delay and the second delay, a subframe to send the ACK/NACK information corresponding to the data packet.

2. The method according to claim 1, wherein computing the second delay by using the processing capability information of the user equipment and the data information of the data packet comprises:

determining the data information of the data packet, wherein the data information comprises at least a size and a modulation order of the data packet;

determining, based on the processing capability information and the data information, a delay capability of the user equipment to send the ACK/NACK information corresponding to the data packet; and determining, based on the delay capability, the second delay.

3. The method according to claim 1, wherein the subframe comprises an uplink (UL) control region in which the ACK/NACK information is carried.

4. The method according to claim 1, wherein determining, by the user equipment based on the first delay and the second delay, the subframe to send the ACK/NACK information corresponding to the data packet comprises:

determining, by the user equipment based on a sum of the first delay and the second delay, the subframe to send the ACK/NACK information corresponding to the data packet.

5. A user equipment, comprises:

at least one processor; and a memory, wherein the memory is coupled to the at least one processor and stores programming instructions for execution by the at least one processor, wherein the programming instructions instruct the at least one processor to:

divide, by the user equipment, a set of all available preamble sequences in a random access process into a plurality of sequence groups, wherein each sequence group of the plurality of sequence groups includes a plurality of preamble sequences, and wherein each preamble sequence in a same sequence group corresponds to a same processing capability level;

select, by the user equipment for the random access process, a preamble sequence from a sequence group of the plurality of sequence groups, wherein the sequence group corresponds to a processing capability level of the user equipment;

send, by the user equipment to a base station, processing capability information of the user equipment by using the selected preamble sequence, wherein the processing capability information of the user equipment represents the processing capability level of the user equipment;

receive, by the user equipment, a data packet from the base station;

receive, by the user equipment, downlink control information (DCI) for the data packet from the base station, wherein the DCI comprises a field used to instruct a first delay to be used by the user equipment to send ACK/NACK information corresponding to the data packet, and wherein the first delay is associated with a scheduling requirement or a service priority corresponding to the data packet;

acquire, by the user equipment, data information of the data packet;

compute, by the user equipment, a second delay by using the processing capability information of the user equipment and the data information of the data packet; and determine, by the user equipment based on the first delay and the second delay, a subframe to send the ACK/NACK information corresponding to the data packet.

6. The user equipment according to claim 5, wherein the programming instructions instruct the at least one processor to:

determine the data information of the data packet, wherein the data information comprises at least a size and a modulation order of the data packet;

determine, based on the processing capability information and the data information, a delay capability of the user equipment to send the ACK/NACK information corresponding to the data packet; and determine, based on the delay capability, the second delay.

7. The user equipment according to claim 5, wherein the subframe comprises an uplink (UL) control region in which the ACK/NACK information is carried.

8. The user equipment according to claim 5, wherein determining, by the user equipment based on the first delay and the second delay, the subframe to send the ACK/NACK information corresponding to the data packet comprises:

determining, by the user equipment based on a sum of the first delay and the second delay, the subframe to send the ACK/NACK information corresponding to the data packet.

9. A base station, comprising:

at least one processor;

a memory;

a communications interface; and a bus;

wherein the at least one processor, the memory, and the communications interface are connected to and communicate with each other by using the bus;

wherein the communications interface is configured to establish a communication connection to a user equipment; and wherein the memory is coupled to the at least one processor and stores programming instructions for execution by the at least one processor, and wherein the programming instructions instruct the at least one processor to:
- divide a set of all available preamble sequences in a random access process into a plurality of sequence groups, wherein each sequence group of the plurality of sequence groups includes a plurality of preamble sequences, and wherein each preamble sequence in a same sequence group corresponds to a same processing capability level;
- receive, from the user equipment, processing capability information of the user equipment based on a preamble sequence used by the user equipment for the random access process, wherein the processing capability information of the user equipment represents a processing capability level of the user equipment corresponding to the preamble sequence used by the user equipment;
- send a data packet to the user equipment;
- determine a processing capability of the user equipment according to the processing capability information of the user equipment;
- determine data information of the data packet;
- determine, based on the processing capability and the data information, a second capability of the user equipment to send positive acknowledgement (ACK)/negative acknowledgement (NACK) (ACK/NACK) information corresponding to the data packet; and
- determine, based on a first delay and the second capability of the user equipment to send the ACK/NACK information corresponding to the data packet, a first subframe to be used by the user equipment to send the ACK/NACK information corresponding to the data packet, wherein the first delay is an additional delay instructed by the base station to send the ACK/NACK information corresponding to the data packet, and the first delay is determined by the base station based on at least one of a scheduling requirement or a service priority corresponding to the data packet.

10. The base station according to claim 9, wherein the first delay is determined, by the base station, according to a service priority of the data packet, an information amount of ACK/NACK information transmitted in an uplink control region of a second subframe corresponding to the second capability, or a capacity of the uplink control region.

11. The base station according to claim 9, wherein the first delay is determined, by the base station, according to an information amount of ACK/NACK information transmitted in an uplink control region of a second subframe corresponding to the second capability.

12. The base station according to claim 9, wherein the first delay is determined, by the base station, according to a capacity of an uplink control region of a second subframe corresponding to the second capability.

13. The base station according to claim 9, wherein the base station and the user equipment are in a 5G New Radio (NR) communication network.

* * * * *

UNITED STATES PATENT AND TRADEMARK OFFICE
CERTIFICATE OF CORRECTION

PATENT NO. : 11,968,050 B2
APPLICATION NO. : 16/337871
DATED : April 23, 2024
INVENTOR(S) : Yifan Xue et al.

It is certified that error appears in the above-identified patent and that said Letters Patent is hereby corrected as shown below:

On the Title Page

Column 1 (Prior Publication Data), Line 2, Below "Jan. 23, 2020" insert item (30) therefore
-- (30) Foreign Application Priority Data Sep. 28, 2016 (WO) ................ PCT/CN2016/100503 --.

Signed and Sealed this
Third Day of September, 2024

Katherine Kelly Vidal
*Director of the United States Patent and Trademark Office*